No. 699,250. Patented May 6, 1902.
Z. G. SHOLES.
TYPE WRITING MACHINE.
(Application filed Jan. 11, 1899.)
(No Model.) 13 Sheets—Sheet 1.
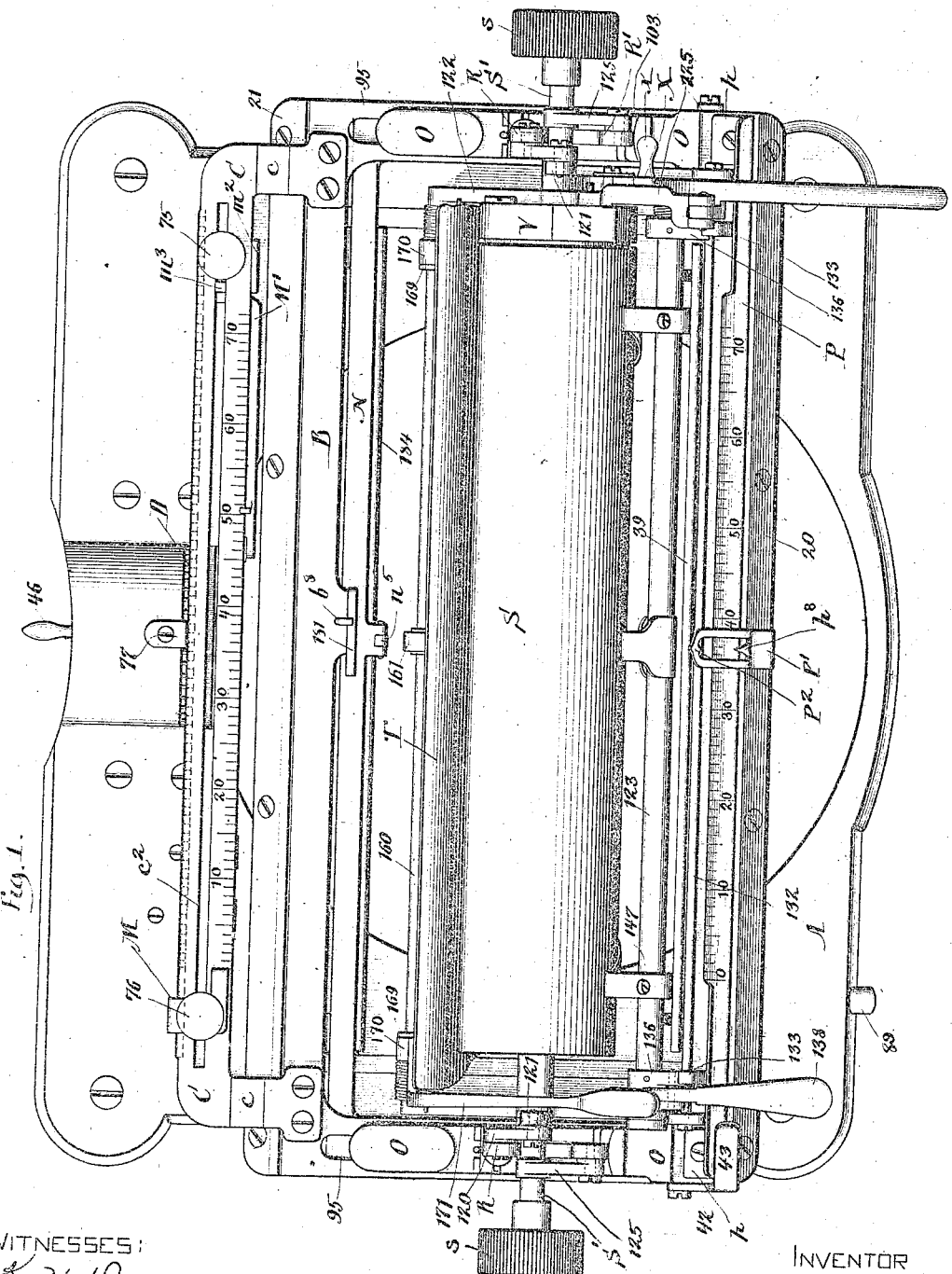
WITNESSES:
K. V. Donovan
E. M. Wells
INVENTOR
Zalmon G. Sholes
by Jacob Felbel
HIS ATTORNEY No. 699,250. Patented May 6, 1902.
Z. G. SHOLES.
TYPE WRITING MACHINE.
(Application filed Jan. 11, 1899.)
(No Model.) 13 Sheets—Sheet 2.
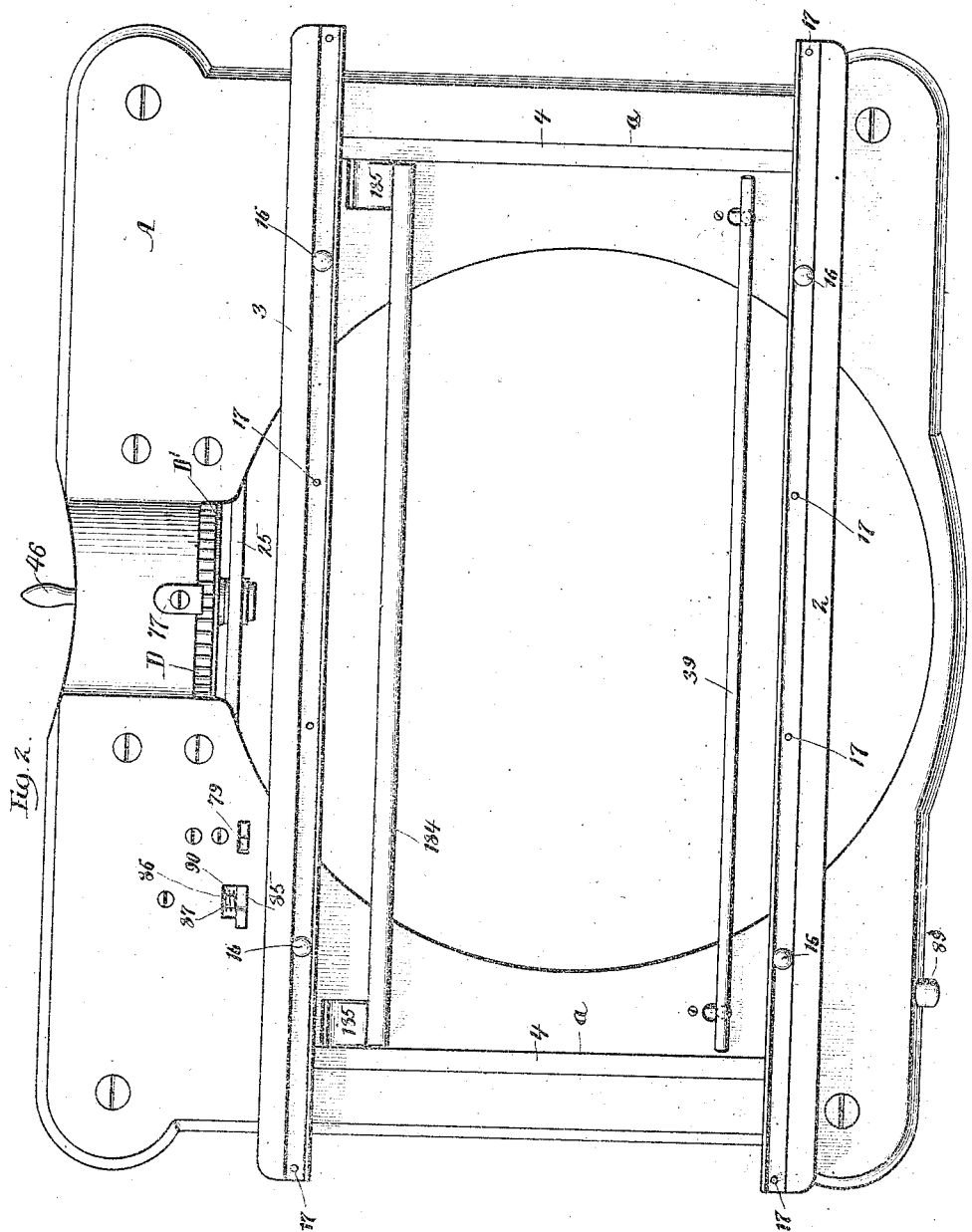

No. 699,250. Patented May 6, 1902.
Z. G. SHOLES.
TYPE WRITING MACHINE.
(Application filed Jan. 11, 1899.)
(No Model.) 13 Sheets—Sheet 3.
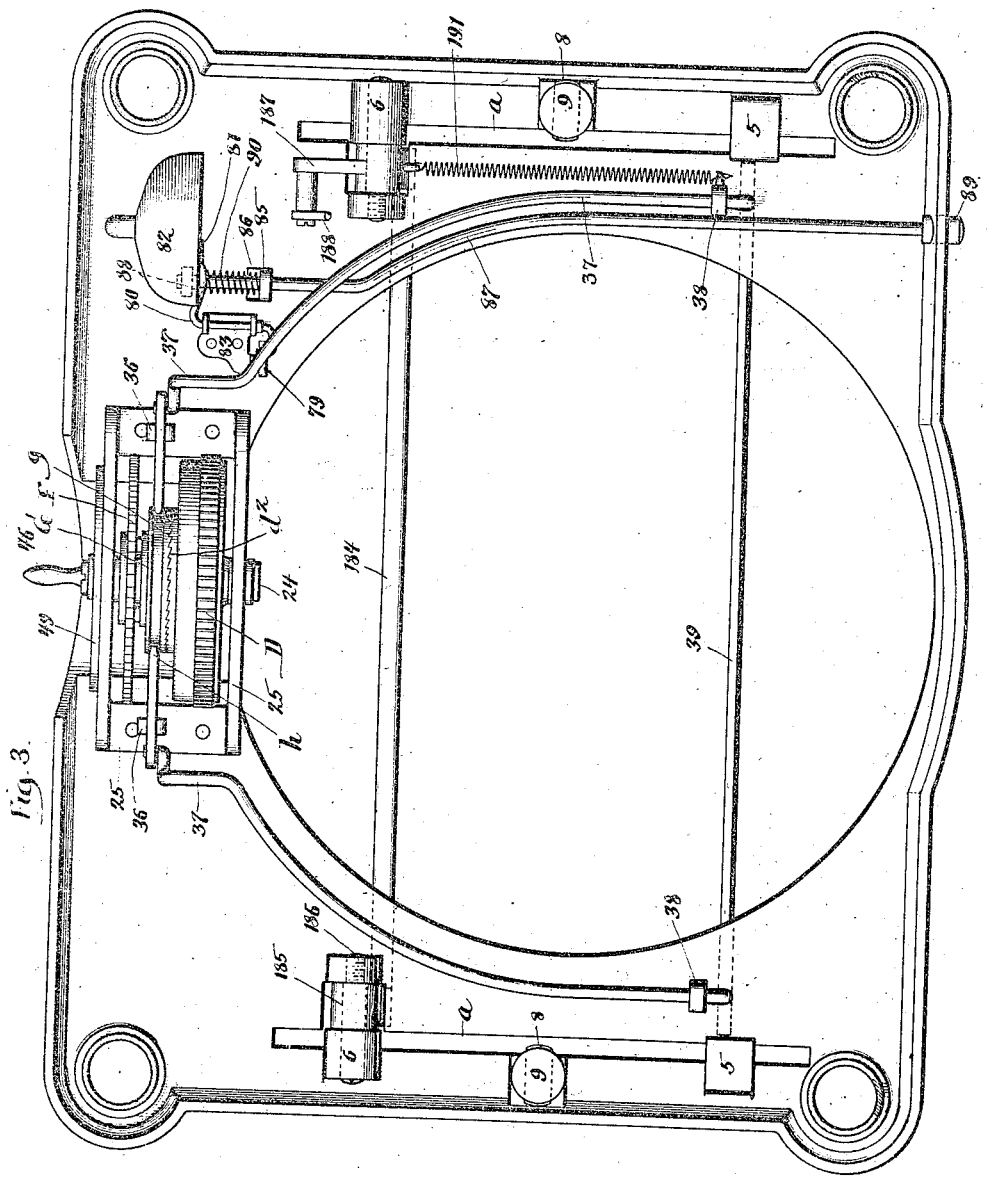
WITNESSES.
K. V. Donovan.
E. M. Wells.
INVENTOR
Zalmon G. Sholes
by Jacob Felbel
HIS ATTORNEY

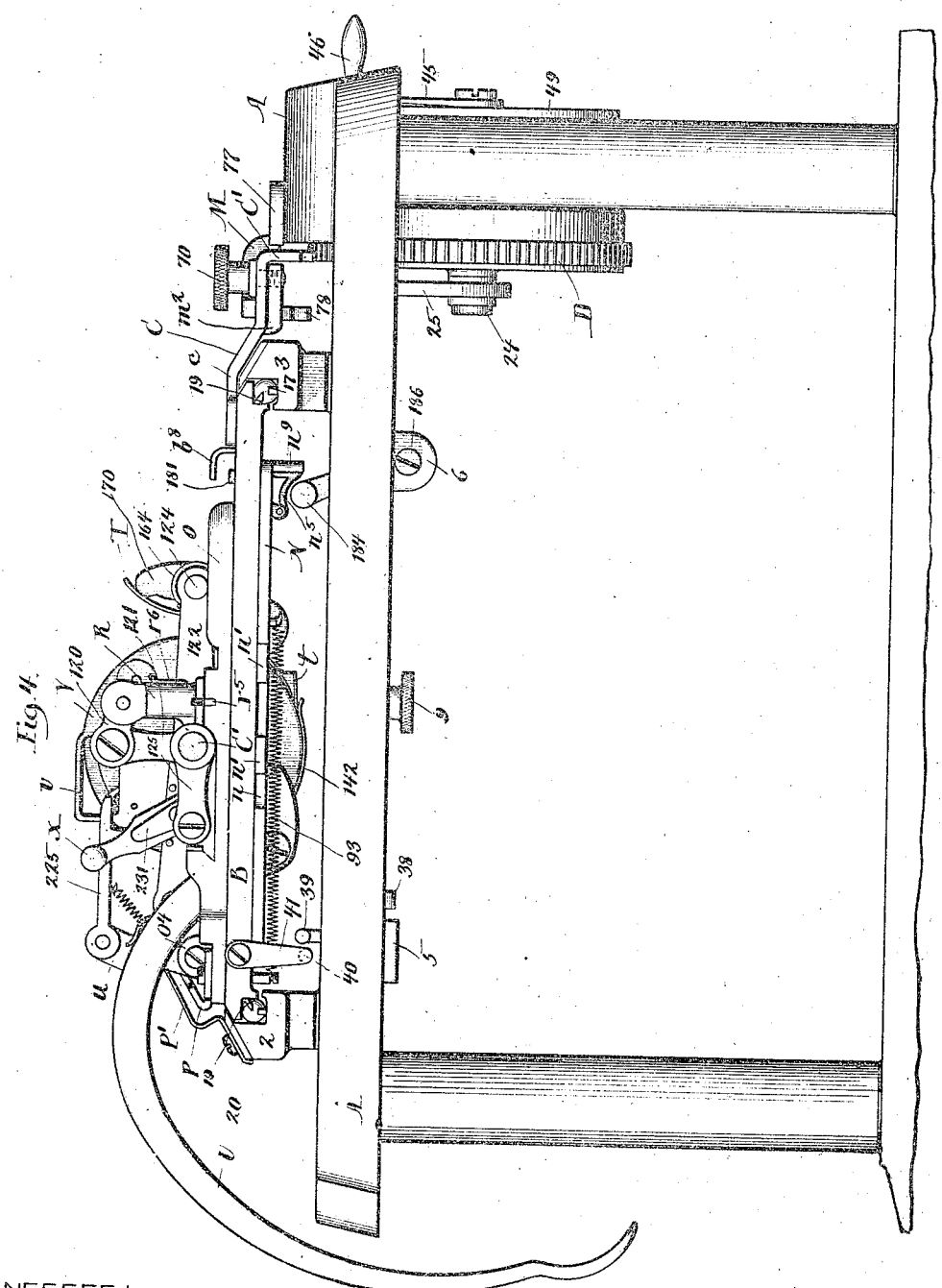

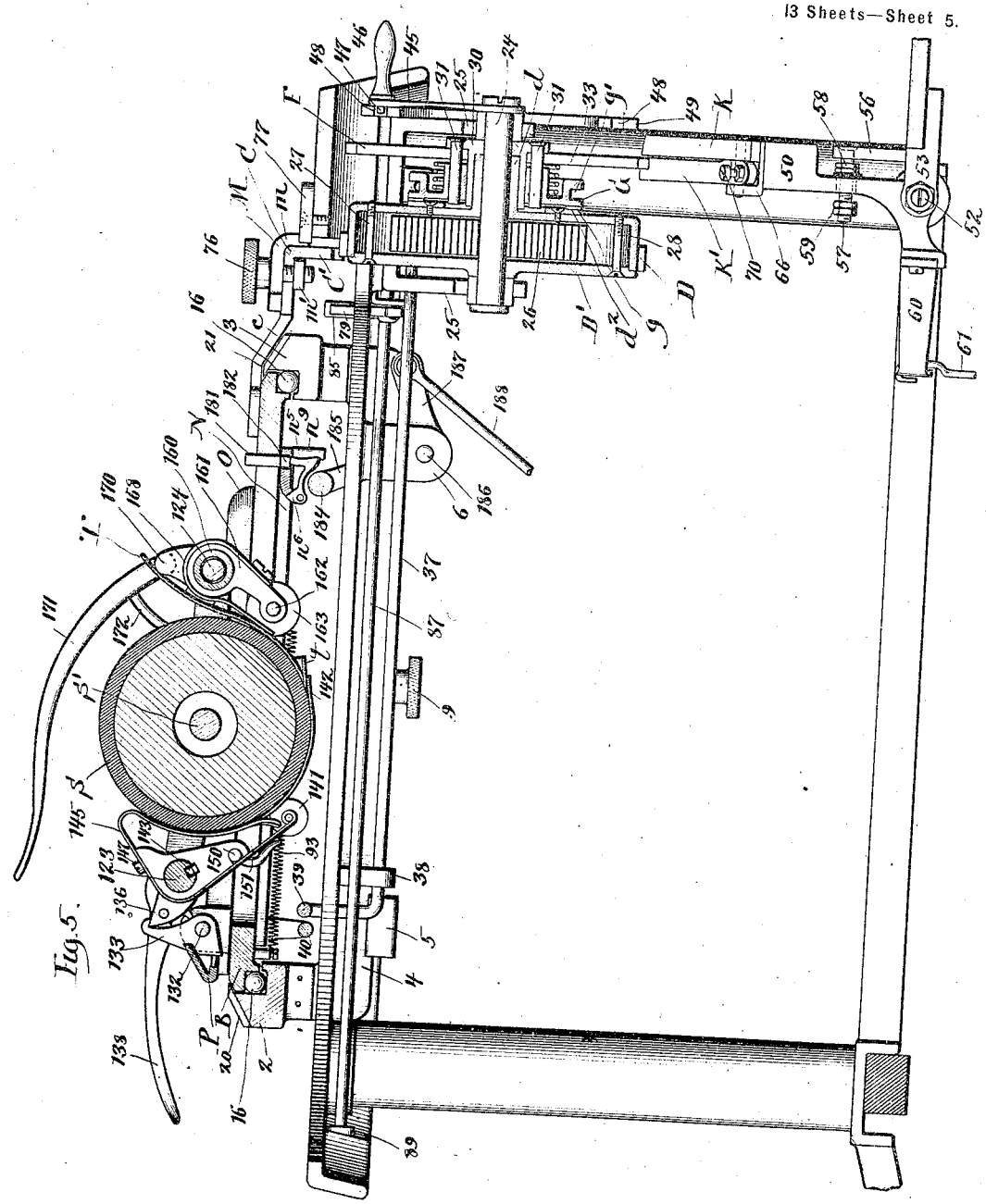

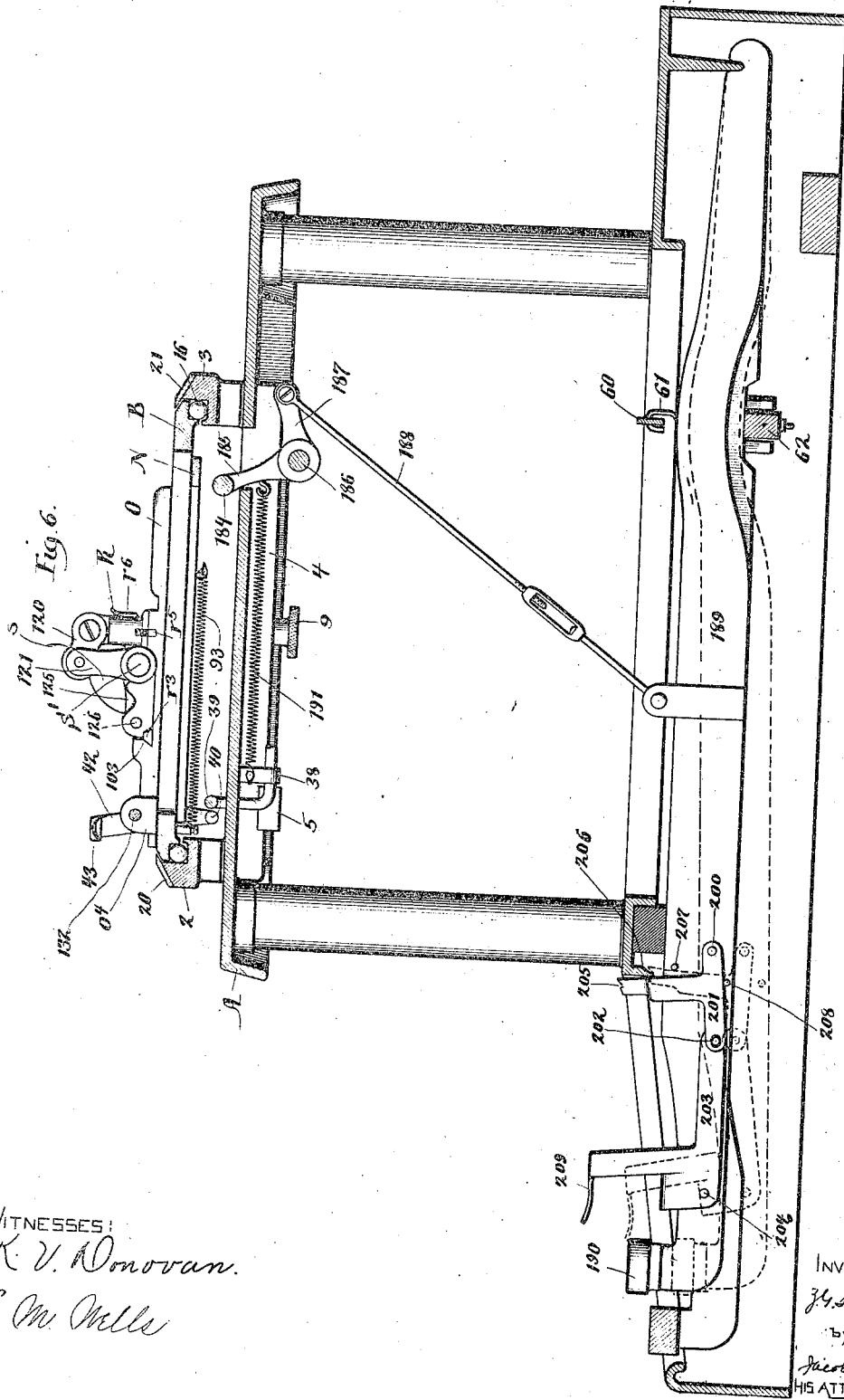

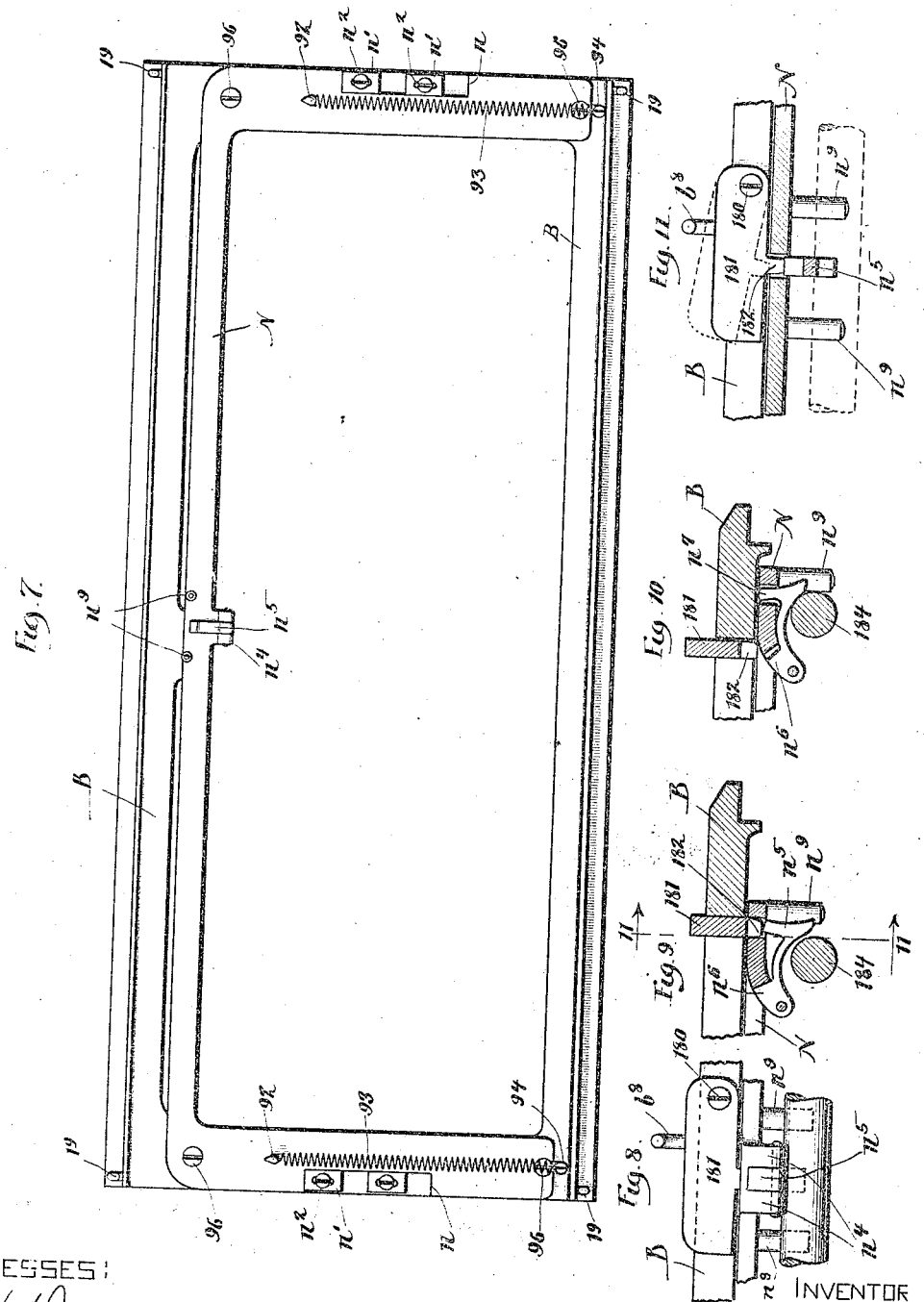

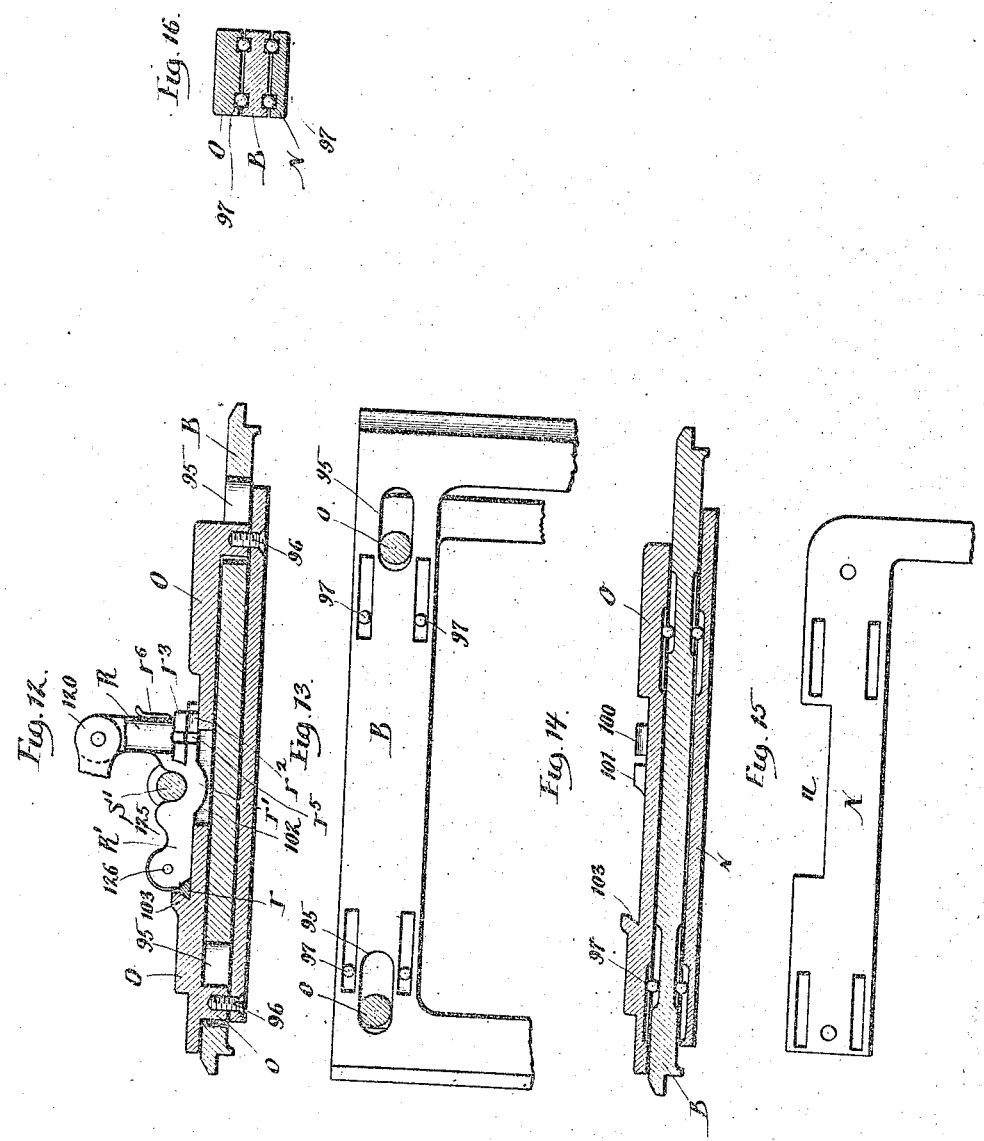

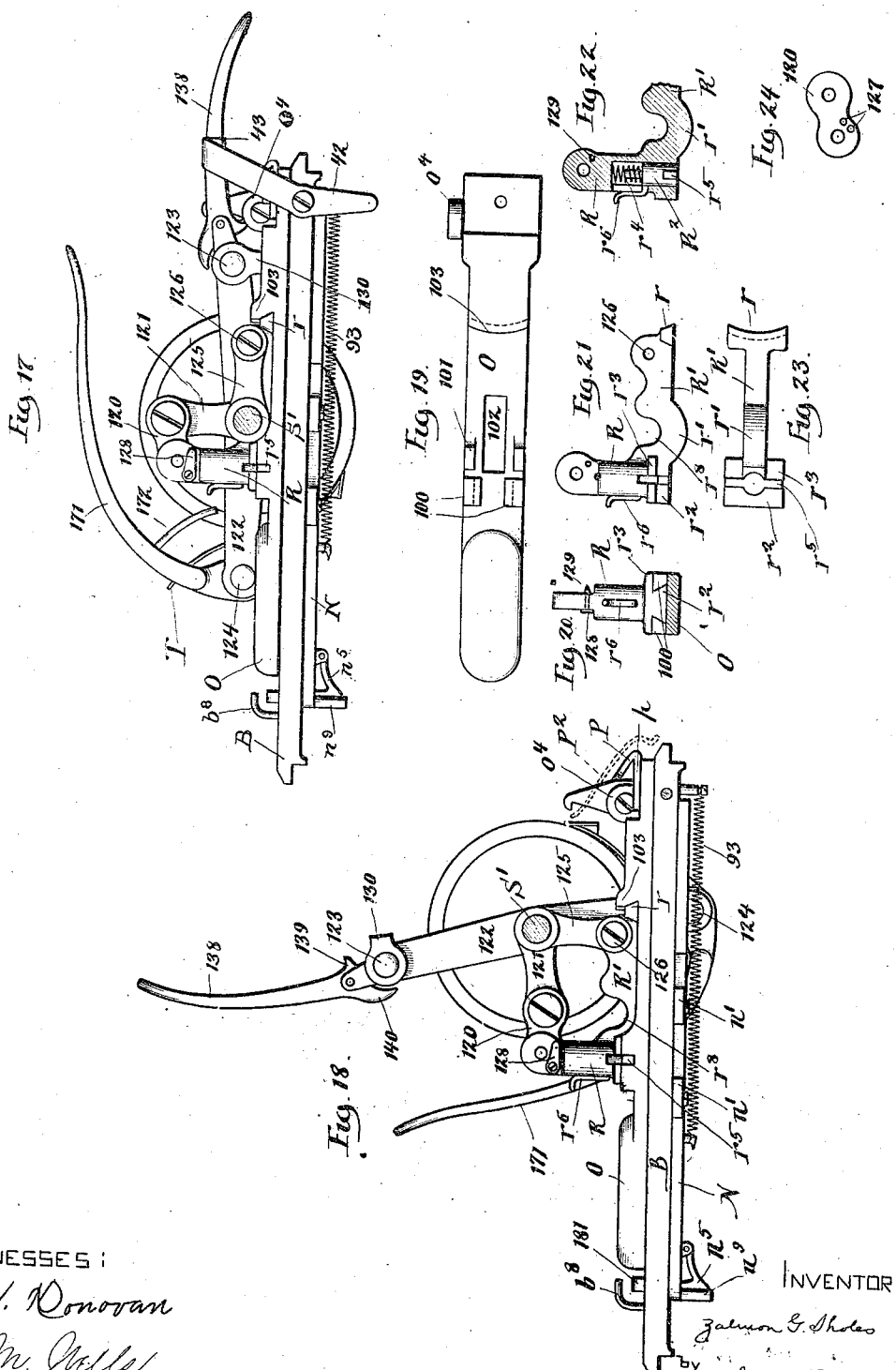

No. 699,250. Patented May 6, 1902.
Z. G. SHOLES.
TYPE WRITING MACHINE.
(Application filed Jan. 11, 1899.)
(No Model.) 13 Sheets—Sheet 10.
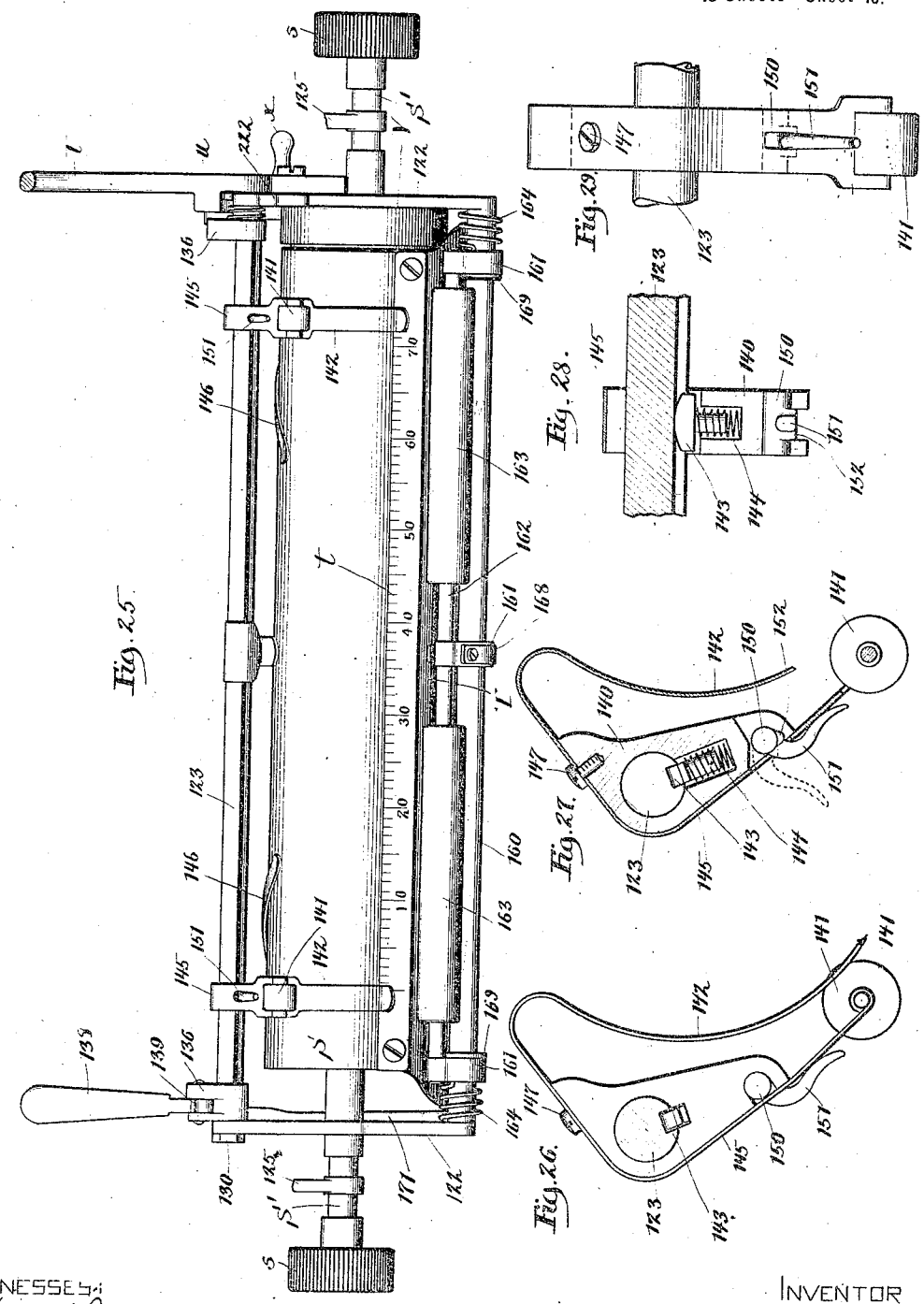
WITNESSES:
K. V. Donovan
E. M. Hills
INVENTOR
Zalmon G. Sholes
By Jacob Felbel
HIS ATTORNEY No. 699,250. Patented May 6, 1902.
Z. G. SHOLES.
TYPE WRITING MACHINE.
(Application filed Jan. 11, 1899.)
(No Model.) 13 Sheets—Sheet 11.
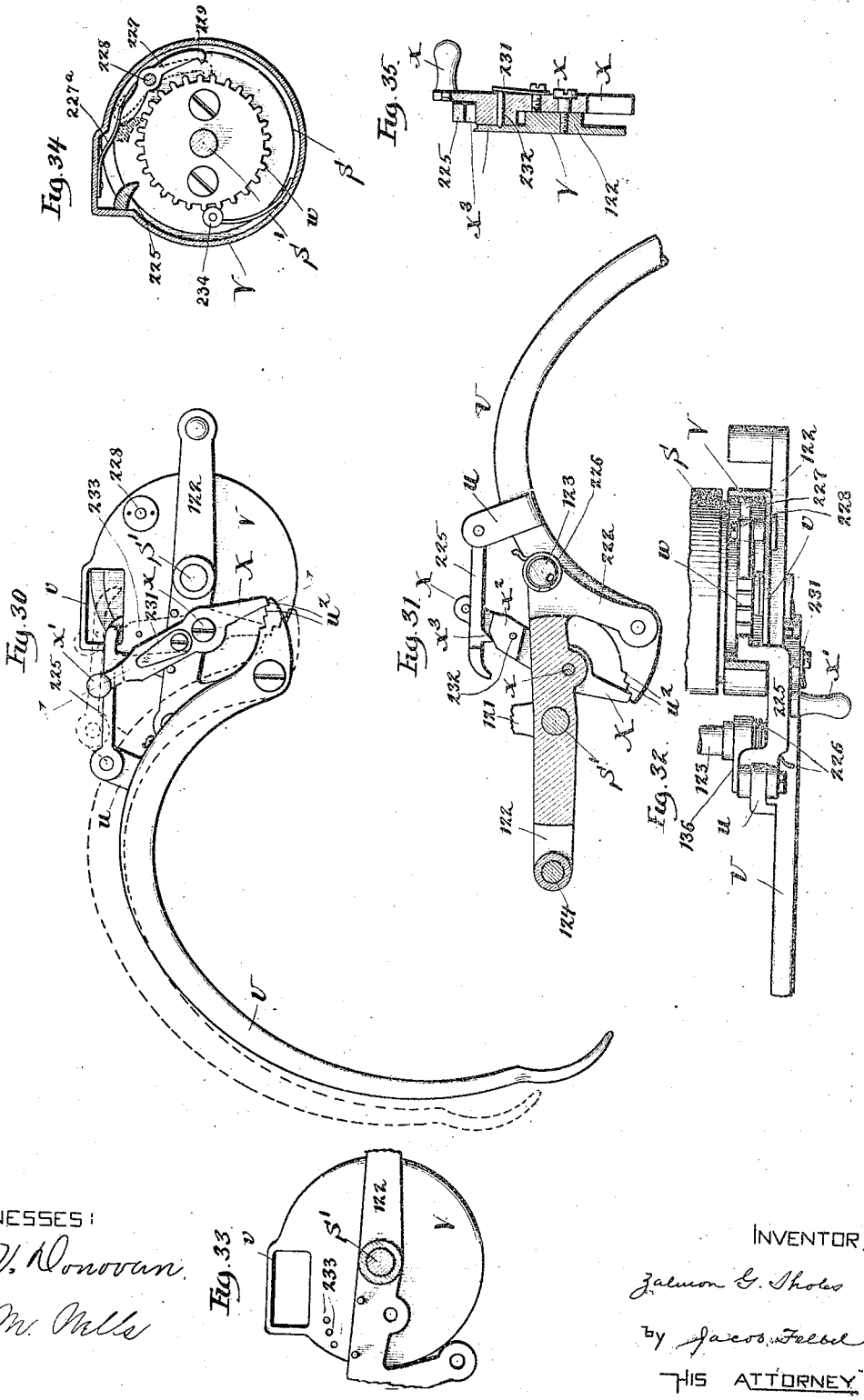

No. 699,250. Patented May 6, 1902.
Z. G. SHOLES.
TYPE WRITING MACHINE.
(Application filed Jan. 11, 1899.)
(No Model.) 13 Sheets—Sheet 12.
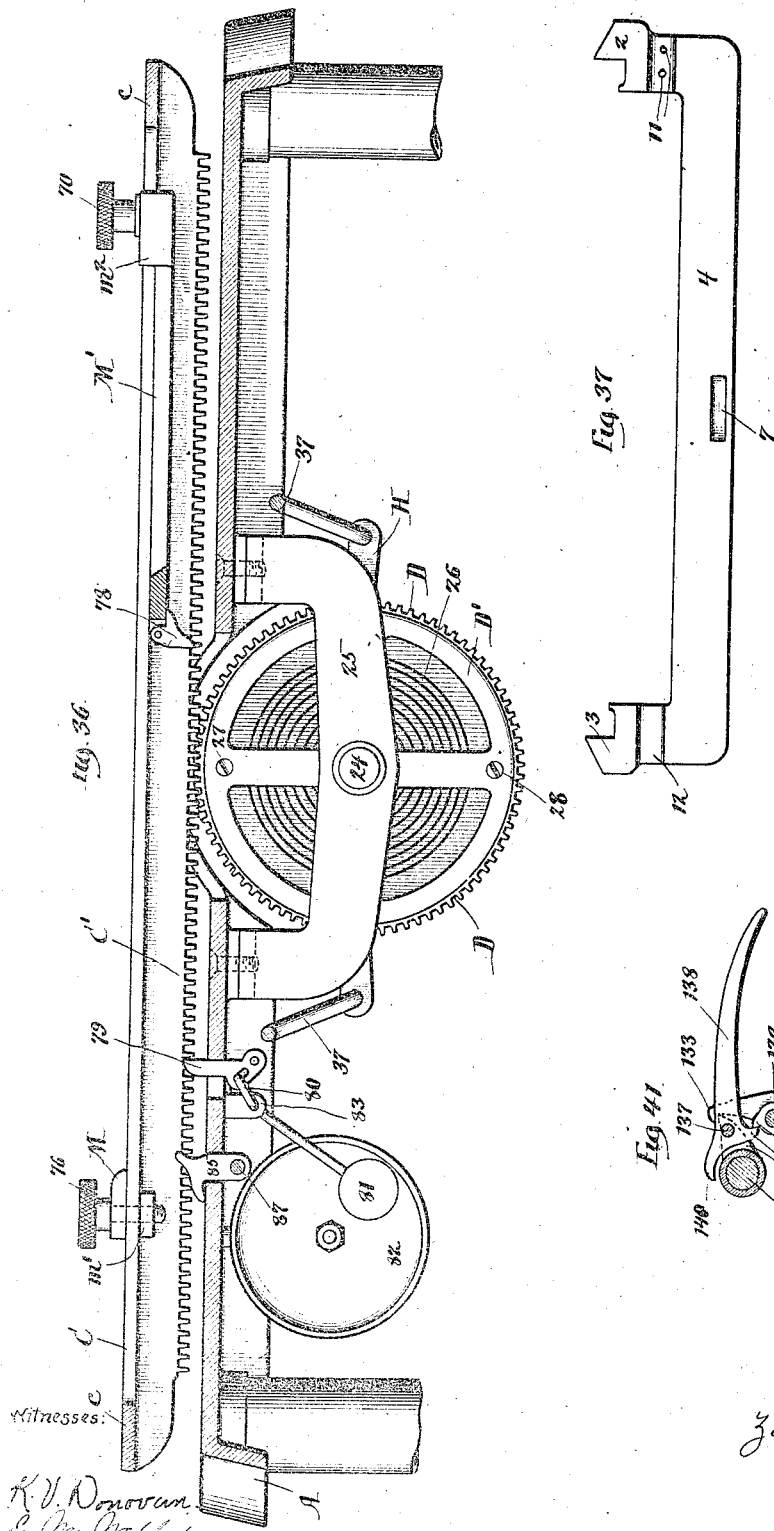
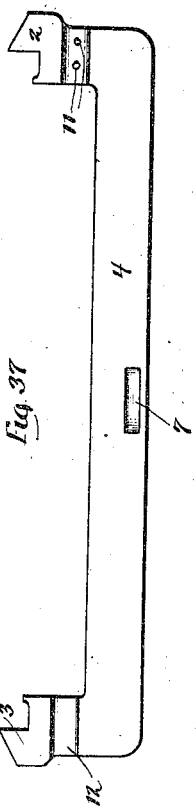
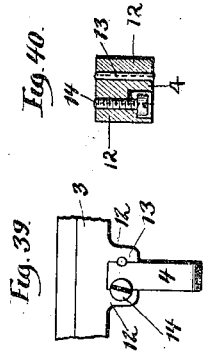
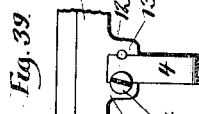
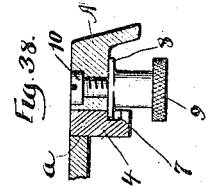
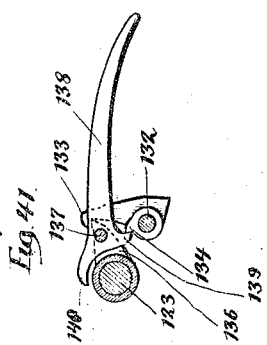
INVENTOR
Zalmon G. Sholes.
by Jacob Felbel
HIS ATTORNEY No. 699,250.  Patented May 6, 1902.
Z. G. SHOLES.
TYPE WRITING MACHINE.
(Application filed Jan. 11, 1899.)
(No Model.) 13 Sheets—Sheet 13.
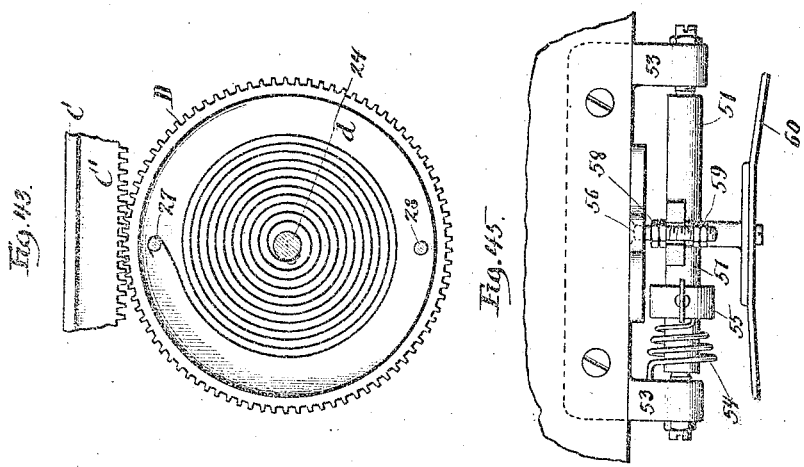
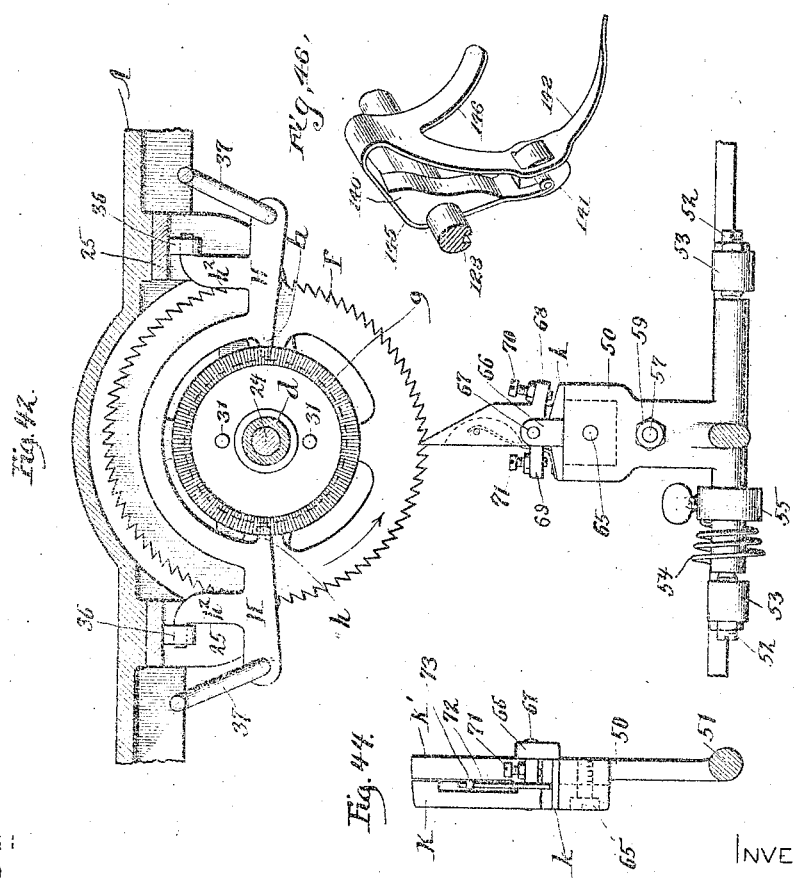
WITNESSES:
K. V. Donovan.
E. M. Wills
INVENTOR
Zalmon G. Sholes
by Jacob Felbel
HIS ATTORNEY

UNITED STATES PATENT OFFICE.

ZALMON G. SHOLES, OF EVANSTON, ILLINOIS, ASSIGNOR TO THE UNION TYPEWRITER COMPANY, OF JERSEY CITY, NEW JERSEY, A CORPORATION OF NEW JERSEY.

TYPE-WRITING MACHINE.

SPECIFICATION forming part of Letters Patent No. 699,250, dated May 6, 1902.

Application filed January 11, 1899. Serial No. 701,801. (No model.)

*To all whom it may concern:*

Be it known that I, ZALMON G. SHOLES, residing at Evanston, Cook county, Illinois, have invented certain new and useful Improvements in Type-Writing Machines, of which the following is hereby declared to be a full, clear, and exact description.

The present invention has relation more particularly to that class of type-writing machines in which the paper to be printed upon is supported upon a carriage to which a step-by-step advance is given through the medium of an escapement as the key-levers are successively operated.

The invention consists in various novel features hereinafter described, illustrated in the accompanying drawings, and particularly defined in the claims at the end of this specification.

Figure 1 is a plan view of a type-writing machine embodying my invention. Fig. 2 is a plan view with the carriage removed. Fig. 3 is an inverted plan view of the top plate of the machine and parts beneath the same. Fig. 4 is a view in end elevation from the right-hand end of the machine. Fig. 5 is a view in central vertical cross-section. Fig. 6 is a view in vertical cross-section at a point adjacent the upper-case shifting key-lever. Fig. 7 is a detail inverted plan view of the carriage and the U-frame connected therewith. Fig. 8 is a detail view, in front elevation, of the lock and release mechanism for the platen-shifting frame. Fig. 9 is a view in central vertical section through Fig. 8. Fig. 10 is a view similar to Fig. 9, but showing the parts in released and shifted position. Fig. 11 is a view in vertical section on line 11 11 of Fig. 9. Fig. 12 is a view in central vertical section through the end bars of the carriage and adjacent parts, certain parts above the carriage being shown in elevation. Fig. 13 is a detail plan view of one end of the carriage. Fig. 14 is a view in vertical section through one end of the carriage, this section being taken on the line of travel of the antifriction-balls. Fig. 15 is a detail plan view of one of the ends of the U-frame beneath the carriage. Fig. 16 is a view in cross-section through one end of the carriage and parts connected therewith, the section being taken through the grooves wherein the antifriction-balls travel. Fig. 17 is a detail end view of the carriage, the platen, and connected parts. Fig. 18 is a view similar to Fig. 17, but showing the platen upturned to expose the line of print. Fig. 19 is a detail plan view of one of the end bars of the platen-shifting frame. Fig. 20 is a view in vertical cross-section through the end bar shown in Fig. 19 with one of the platen-supporting pillars mounted thereon. Fig. 21 is a detail view, in side elevation, of one of the pillar-blocks at the end of the platen. Fig. 22 is a view in vertical longitudinal section through the pillar-blocks shown in Figs. 20 and 21. Fig. 23 is a plan view of the pillar-blocks shown in Fig. 21. Fig. 24 is a detail view, in side elevation, of one of the links whereby the platen-frame is supported. Fig. 25 is a detail inverted plan view of the platen and its tilting frame with parts carried thereby. Fig. 26 is a detail end view of one of the front presser-rolls and spring-fingers, the front bar of the tilting platen-frame being shown in cross-section. Fig. 27 is a view in central vertical section through a support of one of the front presser-rolls. Fig. 28 is a view in vertical section through the support of one of the front presser-rolls and through the rod whereon it is mounted. Fig. 29 is a detail view, in front elevation, of the support whereby one of the front presser-rolls is carried. Fig. 30 is a detail end view of the platen and line-spacing mechanism connected therewith, the journal of the platen being shown in cross-section. Fig. 31 is a view showing part of the line-spacing mechanism from the side opposite that shown in Fig. 30. Fig. 32 is a plan view of the parts shown in Fig. 30, parts being broken away. Fig. 33 is an end view of the shield or housing adjacent the right-hand end of the platen. Fig. 34 is a view in vertical section through the shield or housing shown in Fig. 33, the section being taken adjacent the end wall of the shield and looking toward the end of the platen. Fig. 35 is a view in vertical section through the line-space regulator shown in Fig. 30 looking in the direction of the arrows there shown. Fig. 36 is a view in vertical longitudinal section through the upper portion of the machine in front of the escapement mechanism. Fig. 37 is a detail view, in side elevation, of one of the cross-bars whereby the supporting-rails for the carriage are connected together, the ends of these rails being shown attached to the cross-bar. Fig. 38 is a view in cross-section through the top plate of the machine, showing the means for connecting the cross-bars of the carriage-supporting rails thereto. Fig. 39 is a rear end view of one of the carriage-supporting bars shown in Fig. 37 with a part of the rear carriage-supporting rail thereon. Fig. 40 is a detail view, in horizontal section, through the adjusting screw and pin shown in Fig. 39. Fig. 41 is a detail view showing the means for simultaneously releasing and tilting the platen. Fig. 42 is a detail view, in vertical longitudinal section, through the escapement mechanism, this view being taken upon the meeting line of the clutch-teeth. Fig. 43 is a detail view showing the carriage rack-bar, the wheel or pinion in gearing therewith, and the spring connected to said pinion for advancing the carriage. Fig. 44 is a detail view, in side elevation, of the escapement-dogs and their support. Fig. 45 is a view in horizontal section through the support for the escapement-dogs, the base of said support and connected parts being shown in plan. Fig. 46 is a perspective view of an improved paper-guide.

The main frame of the machine may be of the usual or any suitable construction, the top plate A being modified to support certain parts of my improved mechanism. Upon the top plate A of the main frame are mounted the front and rear rails 2 and 3, that sustain the platen-supporting carriage, and the rails 2 and 3 are connected together by the end bars 4, that set within slots $a$ of the main frame and rest upon the lugs 5 and 6, that depend from the under side of the top plate. (See Figs. 2, 3, 5, and Figs. 37 to 40.) In each of the cross-bars 4 is formed a groove 7, adapted to receive an arm or flange 8, that projects from the barrel of a thumb-nut 9, that is held upon a screw 10, passing through the top plate A, adjacent the cross-bar 4, these thumb-nuts 9 thus serving to securely retain the locking-bar in position upon the top plate. The front carriage-supporting rail 2 is permanently fixed to the front ends of the cross-bars 4 by means of pins 11, (see Fig. 37;) but the rear carriage-supporting rail 3 is adjustably connected to the rear ends of the cross-bars 4, as clearly shown in Figs. 39 and 40 of the drawings. By reference to Figs. 37, 39, and 40 it will be seen that each of the rails 2 and 3 is formed with depending lugs 12, that straddle the upturned ends of the bars 4, and the rear ends of these bars are formed with semicircular seats, while corresponding seats are formed in the depending lugs 12 of the rear rail 3. These semicircular seats serve to receive, respectively, the pins 13 and the adjusting-screws 14, the pins aiding to lock the parts against vertical displacement, while the adjusting-screws 14 engage threads upon the interior of the semicircular seats formed in the ends of the bars 4. The heads of the screws 14 set within recesses in the ends of the bars 4 and bear against shoulders formed on the adjacent lugs 12, depending from the back rail 3. Hence it will be seen that by turning the screws 14 toward the right the heads of the screws will force forward the rear rail in order to exactly position the same with respect to the superposed rear rail of the carriage.

From the foregoing description it will be seen that by releasing the locking-nuts 9 the cross-bars 4 and carriage-supporting rails 2 and 3 can be removed whenever it is desired to employ rails and carriages or platens of different lengths. It will be seen that the projecting part 8 upon each nut 9 forms a button or latch, which is adapted to a seat or bearing 7 in the cross-bar, so as to releasably lock the frame upon the top plate of the machine, and that by simply turning the thumb-piece 9 until the latch or button is withdrawn from said seat the frame is released and may be withdrawn from the machine together with the carriage. Upon the frame being returned to position a slight turn of the thumb-piece 9 reëngages the latch 8 with its seat 7, thus firmly locking the frame. It will also be seen that the slots $a$ coöperate with the lugs 5 and 6 to form seats for the carriage-rail frame and that the latter is held upon these seats by the said latches, or, in other words, the latches coöperate with both the slots and the lugs to hold the frame in position.

The carriage-supporting rails 2 and 3 have their upper faces grooved to receive the anti-friction-balls 16, the shifting of the balls from the grooves being prevented by the stop-pins 17. (See Fig. 2.) The carriage B is shown as consisting of a rectangular frame, (see Fig. 7,) the front and back bars of which extend over the rails 2 and 3, respectively, and the lower faces of these bars are grooved to form channels for the ball 16, and their ends are provided with stop-pins 19 to prevent the escape of the balls. Upon the tops of the front and rear rails 2 and 3 are fixed the plates 20 and 21, (see Fig. 6,) that overlap the front and back carriage-bars, respectively, and serve to guard the carriage against displacement. To the back bar of the carriage B are fixed arms $c$, (see Figs. 1 and 4,) that carry the margin stop-bar C, from which depends the rack-bar C', that engages the gear-wheel D. (See Figs. 5 and 36.) Preferably this wheel D is cup-shaped, and its long hub $d$ is revolubly mounted upon a shaft 24, that is journaled in the front and rear bars of a frame 25, bolted to and depending from the top plate of the main frame. (See Figs. 3, 5, and 36.) To the shaft 24 is attached one end of a convolute carriage-advancing spring 26, that encircles the shaft, the opposite end of this spring being fixed to a bolt 27, projecting from the wheel D, this bolt 27 and a similar bolt 28 serving to unite to the wheel a skeleton cap D', that forms its front face. Upon the hub $d$ of the gear-wheel D is mounted a bearing-sleeve 30, the flanged rear end of which is attached by the bolts 31 to the escapement ratchet-wheel F. The bolts 31 pass through holes formed in the hub of the clutch-wheel G, that is free to slide upon the bolts. The front face of the clutch-wheel G is formed or provided with shallow beveled teeth $g$, annularly arranged and adapted to engage with a similar toothed ring $d^2$ on the rear face of the wheel D, and a coiled spring 33, that encircles the hub of the clutch-wheel G, serves to normally hold the toothed rings $g$ and $d^2$ in engagement. The periphery of the clutch-wheel G is formed with an annular groove $g'$, into which project the arms $h$ of the clutch-shifter H, (see Figs. 3 and 42,) that is pivotally hung by arms $h^2$ from the lugs 36, that depend from the top plate of the frame 25. The clutch-shifter H is preferably bowed, as shown in Fig. 42, in order that its arms $h$ may better engage the wheel G, and to the opposite ends of this shifter are attached the sliding rods 37, that pass through and are supported by lugs 38 upon the under side of the top plate, (see Fig. 3,) the upturned ends of these rods 37 passing through long slots formed in the top plate A of the machine and being attached to the transverse rod 39, (see Fig. 5,) that extends across the top plate and below the carriage.

Beneath the carriage B and from end to end thereof extends a shifting-rod 40, that is connected at one end to a swinging arm 41, (see Fig. 4,) that depends from the end of the carriage B and at its opposite end is connected to a release-lever 42, (see Figs. 1 and 17,) that is pivotally connected to the opposite or left-hand end of the carriage. The upper end of the lever 42 is bent forwardly and toward the right, being provided with a finger-piece 43 in order to be conveniently manipulated by the operator. (See Figs. 1, 6, and 17.) To the outer end of the shaft 24 is fixed a winding-arm 45, whereby the shaft will be turned in order to increase or diminish the tension of the convolute spring 26. This arm 45 is formed of thin flexible metal and at its free end is provided with a handle 46 and upon its inner face with a pin 47, adapted to enter holes 48, arranged at suitable distances around an annular bar 49, that is fixed to the back part of the frame 25. (See Fig. 5.) By retracting the handle 46 the pin 47 may be released from engagement with the ring 49, and by turning the handle the desired tension can be given to the convolute spring 26.

With the ratchet-wheel F engage the escapement-dogs K and K', that are carried by the vibratory frame 50, (see Figs. 5, 42, and 45,) the arms 51 of this frame being pivotally connected by the journals 52 to a bracket 53, that is fastened to the base of the machine. Upon one of the arms 51 of the vibratory frame 50 is mounted a coil-spring 54, one end of which is fixed to a collar 55 upon the arm 51, while the opposite end of the spring engages the bracket 53. From the front edge of the bracket 53 rises a bar 56, from which projects forwardly a threaded bolt 57, this bolt passing through an opening formed in the vibratory frame 50 and being provided with set-nuts 58 and 59 in order that the extent of vibration of the frame may be accurately regulated. To the base of the vibratory frame 50 is connected a bar 60, leading to the sides of the machine, at which points it will be united by suitable rods 61 with the universal bar 62, that extends beneath the key-levers of the machine. (See Fig. 6.) The top of the vibratory frame 50 is provided with an overhanging portion, (see Fig. 44,) and this portion is provided with a squared vertical recess or groove, through which passes the squared lower end of the rigid dog K, a screw 65 being employed to rigidly connect the dog with the frame. The dog K is provided with horizontally-extending arms or wings $k$ on three sides thereof, and these wings are beveled at opposite sides of the dog, while the third side is provided with an upwardly-extending arm or lug 66, through which passes the pivot-bolt 67, that carries the limber dog K'. The dog K' is provided at its base with lugs 68 and 69, that carry set-screws 70 and 71, by which the extent of movement of the dog K' can be accurately determined. A spring 72, rising from the wings $k$, engages a pin 73, projecting from the side of the dog K', and serves to retract the dog to normal position.

From the foregoing description it will be understood that when either the key-levers or spacing-levers of the machine are operated, thereby effecting a depression of the universal bar 62, the vibratory frame 50 will be rocked, causing the dogs K and K' to swing across the teeth of the ratchet-wheel F. The convolute spring 26, acting upon the shaft 24 and through the medium of this shaft upon the ratchet-wheel F, tends to turn said wheel in the direction of the arrow, Fig. 42, in order to advance the carriage, and when at rest the teeth of the wheel F engage the limber dog K' and hold it against the force of the spring 72 in vertical line with the rigid dog K. When, however, the frame 50 is rocked by the depression of the key-lever, the limber dog K' will be thrown out of engagement with the ratchet-wheel F, and the rigid dog K will be thrown into engagement therewith. As the limber dog K' escapes from the ratchet-wheel the spring 72 shifts this dog out of alinement with the rigid dog K, so that as the key-lever is released the limber dog will enter the interdental space of the ratchet-wheel next that from which it had just escaped; but as the ratchet-wheel is caught by the limber dog the convolute spring 26 will force the limber dog again into normal position in line with the rigid dog, thus permitting a movement of the gear-wheel D, and consequently of the carriage, for the space necessary to permit the printing of successive type, as will be readily understood by those familiar with machines of this general character.

When it is desired to retract the paper-carriage at the end of a line, the operator can move the carriage freely toward the right, because the teeth $g$ of the clutch-wheel G and the teeth $d^2$ of the gear-wheel D are so inclined that as the carriage is moved toward the right the teeth $d^2$ will ride over the teeth $g$, merely moving the clutch-wheel G rearward against the force of the coil-spring 33. When it is desired to move the carriage freely either toward the right or left, the operator can depress the finger-piece 43 of the release-lever 42, (see Figs. 1, 3, and 5,) thereby causing the rod 40 to engage the bar 39 and through the medium of the sliding rods 37 to cause the clutch-shifter H to swing rearwardly until the clutch-wheel G is so far retracted that its teeth $g$ shall be free from engagement with the teeth $d^2$ of the gear-wheel D.

The margin stop-bar C (see Fig. 1) is provided with a long slot $c^2$ to permit the passage therethrough of the thumb-screws 75 and 76, whereby the margin-stops M and M' are adjustably held upon the bar C. The left-hand margin-stop M is preferably formed of the shape shown in Figs. 1 and 5—that is to say, with an arm resting upon the numbered scale on the surface of the bar C and with the downwardly-bent arm $m$, adapted to contact with the center stop 77, that limits the movement of the carriage as it is drawn toward the right. A nut $m'$ engages the threaded lower end of the screw 76 beneath the bar C and serves to securely retain the margin-stop M in position. The right-hand margin-stop M' is shown as formed of a plate having at one end an upturned flange $m^2$, that bears against the edge of the plate C, and an upturned lug $m^3$, that extends within the slot $c^2$, (see Fig. 1,) the flange and lug serving to aid in holding the margin-stop in position. The outer end of the margin-stop M' is formed with a threaded hole to receive the threaded end of the thumb-screw 75, whereby the margin-stop is fixed in any desired position. The inner end of the margin-stop M' has pivoted thereto a pawl 78, adapted to contact with a pivoted arm 79, carried by the main frame, this arm 79 being attached to the upwardly-bent end of the bell-crank lever 80, the lower end of which lever carries the striker 81, adapted to contact with the bell 82, and thus signal the operator that the carriage is approaching the end of its movement. (See Figs. 2, 3, 5, and 36.) The bell-crank lever 80 is journaled to a bracket 83, depending from the under side of the top plate of the main frame, as clearly seen in Fig. 3. It will thus be seen that when the pawl 78 during the forward movement of the carriage strikes the upper end of the arm 79 it will rock the bell-crank lever 80, causing the striker 81 to rise until the pawl 78 passes over and from engagement with the arm 79, when the striker 81 will descend and strike the bell 82. It will be seen that the pawl 78 is provided with the usual shoulder that restricts its movement as the carriage travels to the left, but permits the pawl to swing upward and freely over the arm 79 as the carriage is retracted to the starting-point.

In line with the arm 79 and in the path of the margin-stop pawl 78 is located a stop-arm 85, (see Figs. 3 and 36,) that extends upward through a slot 86 in the top plate, the lower end of this arm 85 being fixed to a stop-shifter rod 87, that is mounted beneath the top plate of the main frame, one end of this rod being mounted in manner free to slide in a suitable hanger-lug 88, while the opposite end of the rod passes through an opening formed in the depending flange of the top plate A at the front of the machine, the rod being there provided with a finger-piece 89, whereby the rod can be conveniently shifted. The rod 87 is forced outward to the normal position (seen in Fig. 3 of the drawings) by means of a coil-spring 90, that encircles the inner end of the rod, one end of this spring bearing against the lower end of the stop-arm 85, while the opposite end of the spring bears against the depending lug 88.

From the foregoing description it will be seen that the operator by shifting the margin-stops M and M' may determine the extent of travel of the carriage in either direction, so as to give the desired extent of margin to the printed page at either side thereof. Inasmuch as the stop-arm 85 has its upper end projecting into the path of the pawl 78 on the margin-stop M', it is obvious that when the pawl 78 contacts with the arm 85 the movement of the carriage will be arrested. If it is then desired to print an additional letter or letters beyond the predetermined line of print, the operator will press inward the button 89, (see Fig. 2,) thereby causing the stop-arm 85 to pass out of the path of travel of the pawl 78, so that the carriage will be free to move toward the left to permit the additional letters to be printed.

Beneath the carriage B extends a U-shaped frame N, (see Fig. 7,) the end bars of this U-frame being formed with the slots $n$ to receive the stop-blocks $n'$, that are attached to the under side of the end bars of the carriage by means of the set-screws $n^2$. The stop-blocks $n'$ are provided with long slots, as shown, in order to permit of a slight adjustment of the blocks for the purpose of determining with exactness the throw of the U-frame N, the movement of the frame being limited by the position of the stop-blocks within the slots $n$. From the under side of the end bars of the frame N project pins 92, to which are connected the inner ends of the coil-springs 93, the opposite ends of these springs being connected to pins 94, depending from the under side of the carriage B. (See Fig. 6.) The springs 93 serve to normally hold the U-frame N and the parts connected therewith in the position shown in the drawings. By reference more particularly to Figs. 12 and 13 of the drawings it will be seen that the end bars of the carriage B are formed with the long slots 95, through which project lugs $o$, depending from the under side of the sliding bars O, these sliding bars being conveniently attached to the end bars of the frame N by means of the screws 96. The frame N and the sliding bars O constitute the supplemental carriage whereby the platen is sustained in manner permitting it to move at right angles to the line of travel of the main carriage B, the purpose of such movement being to enable the shift of the platen necessary to permit either of several type carried upon a single type-bar to strike the printing-point of the platen. By reference to Figs. 13 to 16 it will be seen that in the upper and lower faces of the end bars of the carriage B are formed grooves or channels to receive the antifriction-balls 97, and similar channels are formed at coincident points in the under face of the end bars O and in the upper face of the end bars of the frame N. The supplemental carriage, that consists of the frame N and sliding bars O, will thus be sustained so as to move with the least possible friction upon the main carriage B. The front ends of the sliding bars O are connected together by means of a scale-plate P, the ends of this plate having inwardly-turned portions $p$, that rest upon and are fixed to the ends of the bars O, while the body of the scale-plate P extends at an angle of about forty-five degrees from the vertical in order to be more readily observable by the operator. A center pointer P', that is fixed to the front carriage-supporting rail 2, (see Figs. 1 and 4,) extends over the scale-plate P, and thus enables the operator to observe at all times the exact position of the carriage, the point $p^8$ of the center pointer corresponding exactly with the printing-point of the type. The center pointer P' is also preferably provided with a supplemental pointer $P^2$, that extends inward, so as to be in proximity to the printing-point when the platen is turned upward to expose the line of print, as will hereinafter more fully appear.

By reference to Figs. 1, 12, 14, 17–23 of the drawings it will be seen that the upper faces of the sliding bars O serve to support the platen-frame posts R, the preferred construction of which posts is that shown in the drawings. These posts R serve to sustain the platen and its tilting frame, and the posts are removably connected to the sliding bars O of the supplemental carriage, so that the operator can readily remove one platen and its tilting frame whenever it is desired to substitute another therefor. The upper face of each of the sliding bars O is formed with the dovetailed studs 100 and the vertical studs 101, with the slot 102, and with the dovetailed lip 103. The lip 103 is adapted to engage the corresponding dovetailed front edge $r$ of the base R' of the post R, and the lip 103 and edge $r$ are preferably curved, as seen in Figs. 19 and 23, in order to guard against the lateral movement of the base R' upon the sliding bar O. The base R' is formed with an offset $r'$, adapted to enter the seat 102 of the bar O, while that part of the base R' immediately beneath the post R is formed with the dovetailed portion $r^2$, (see Fig. 20,) adapted to engage the corresponding studs 100 on the end bars O. The base of the post R has a flange $r^3$, that will rest upon the studs 100 and 101. In placing each post R and its base R' in position upon the corresponding end bar O the post R will be first set slightly to the rear of the studs 100, so as to permit the dovetailed part $r^2$ of the base to engage the dovetailed studs 100 as the base is slipped forward. By moving the base R' forward the dovetailed part $r^2$ will interlock with the studs 100 and the end $r$ of the base will engage with the dovetailed lip 103, while the offset $r'$ of the base will enter the groove or seat 102. The post R is hollow (see Fig. 22) and is provided with a plunger $R^2$, forced normally downward by a spring $r^4$ within the post, and in the sides of the post R at its base are formed slots, through which project the locking-arms $r^5$ of the plunger $R^2$. The plunger is furnished with a handle or offset $r^6$, whereby it may be lifted against the force of the spring $r^4$. When the post R and base R' are set in position, as above described, the plunger $R^2$ will be lifted until the arms $r^5$ are opposite the spaces between the studs 100 and 101, and the plunger $R^2$ will then be permitted to descend, so as to permit the arms $r^5$ to enter these spaces, and thus securely retain the post R and the base R' in position. Said arms $r^5$ hence operate as latches or locks for holding the posts or brackets upon the end bars O of the carriage.

To the top of each of the posts R at the opposite ends of the supplemental carriage is pivoted a link 120, (see Figs. 17 and 18,) the forward end of this link being pivoted to an arm 121, that is preferably formed in piece with the corresponding end bar 122 of the platen-tilting frame. This platen-tilting frame consists of the end bars 122, the front and rear ends of which are connected together by the front and rear rods 123 and 124, (see Figs. 1 and 5,) and through the end bars of this frame and as well, also, through the platen S passes the platen-journal S', the ends of which project beyond the carriage and are furnished with the usual hand-wheels $s$, whereby the platen can be conveniently turned. Upon the platen-shaft S' at each end of the platen is pivoted a link 125, the lower end of which is pivotally connected at 126 to the corresponding base block or plate R', and each of the base-blocks R' is formed with a seat $r^8$, wherein the platen-shaft will rest when in working position, as shown in Fig. 17 of the drawings. The purpose of mounting the platen-frame upon pivot-links 120 and 125 is to permit the frame to be readily turned upward and the platen to be swung forward toward the indicator-pointer P² when the line of print is to be exposed to the operator's view, and by reference to Figs. 17 and 18 the position of the parts when the platen is in the working and upturned positions, respectively, will be readily understood. In order to retain the platen in the upturned position, (shown in Fig. 18,) one of the links 120 may be provided with seats or indentations 127, (see Fig. 24,) adapted to receive the bevel-ended pin 129, passing loosely through the hole in the post R (see Fig. 21) and pressed in one direction by the free end of a plate-spring 128, (see Fig. 18,) that is fastened to the upper part of the post R. When the platen is turned upward, as shown in Fig. 18, the end of the pin 129 will snap into one of the holes 127 and will retain the platen in upturned position; but when the platen is to be turned downward by the hand of the operator the pressure of link 120 will force pin 129 and spring 128 outward, so as to release the pin from the seat 127. Upon the front end of each of the end bars 122 of the platen-frame is a footpiece 130, adapted to rest upon the upper face of the corresponding sliding bar O. From the front end of each sliding bar O rises a stud o⁴, (see Figs. 5 and 19,) and in these studs are journaled the ends of a rod 132. (See Fig. 1.) Upon this rod 132, adjacent each of its ends, is mounted a latch 133, (see Fig. 41,) the hub of which is provided with a shoulder or offset 134. Upon the front rod 123 of the platen-frame is fixed an arm 136, from which projects laterally a pin 137, whereon is pivoted a throw-off lever 138, the front end of which projects normally forward into convenient reach of the operator. The arm 136 is adapted to engage the hooked upper end of the latch 133, and the lever 138 is formed with a shoulder 139, adapted to engage the shoulder 134 at the side of the latch 133. The inner end of the lever 138 is formed with an arm 140, that permits a slight initial pivotal movement of the lever 138 when the platen is to be turned upward. The result of this initial tilting movement of the lever 138 is that the shoulder 139 by engaging with the shoulder 134 will force the latch 133 from engagement with the arm 136, and hence will permit the platen-frame and platen to be turned in such manner as to expose the line of print to the view of the operator. This construction of locking mechanism for the platen-frame serves to hold the frame against accidental lifting movement when in working position, but enables the operator by a single upward movement of the hand to release the platen-frame and throw the platen to the upturned position. (Seen in Fig. 18.)

Upon the front bar 123 of the platen-frame (see Figs. 1 and 25 to 29) are mounted the sliding blocks 140, that carry the front presser-rolls 141, and preferably, also, the guide-fingers 142. The front rod 123 is shown as formed with a slot extending throughout its length and adapted to receive a shoe 143, the stem of which shoe sets within a chamber in the block 140 and is encircled by a coiled spring 144, that serves to normally force the shoe 143 into engagement with the rod 123. The purpose of the shoe 143 is to prevent the turning of the blocks 140 about the rod and also to frictionally hold the blocks against lateral displacement, while permitting them to be slipped freely in either direction under the pressure of the operator's hand in order to set the rolls for sheets of paper of different widths. The presser-rolls 141 are journaled in the spring-plates 145, the upper ends of these plates being extended downward to form the guide-fingers 142, that serve to guide the sheets of paper upward around the platen. Preferably supplemental guide fingers or branches 146 are extended diagonally toward the center of the platen from the upper portions of the plates 145, as shown in Figs. 25 and 46. These fingers cause the middle portions of the paper to lie smoothly against the platen, thus insuring clear type impressions and also contributing to the accurate feed of the paper around the platen. Each of the plates 145 is connected to the upper part of the corresponding block 140, as by screw 147, so as to permit the lower part of the spring-plate 145 to be moved forwardly in order to relieve the pressure of the roll 141 against the platen, and in order to permit each presser-roll 141 to be thus shifted there is a small cam-shaft 150, journaled in the slotted lower end of each block 140, each cam-shaft being formed with a handle 151, that extends through a slot in the plate 145, and the cam-shaft is formed with lugs 152, adapted to bear against the under side of the spring-plate 145, as shown in Figs. 27 and 29 of the drawings. It will thus be seen that when the pressure of the rolls 141 is to be relieved the operator will shift the handles 151 from the position seen in full lines to the position shown by dotted lines on Fig. 27, thereby causing the lugs 152 of the shafts 150 to engage and move outward the lower ends of spring-plates 145. It will be understood, of course, that the guide-fingers 142 are formed with slots, through which the presser-rolls 141 will pass to engage the surface of the platen. It will thus be seen that the operator can readily shift the front presser-rolls 141 to any position along the platen in keeping with the width of the sheets to be printed upon.

Upon the back rod 124 of the platen-frame is loosely mounted the long sleeve 160, to which are fixed the hubs of the arms 161, (see Figs. 5 and 25,) to the lower ends of which arms are connected the ends of a shaft 162, that carries the back presser-rolls 163. Upon the end portions of the sleeve 160 are mounted coiled torsion-springs 164, (see Fig. 25,) the ends of which springs are connected, respectively, to the end bars of the platen-frame and to the arms 161, the springs serving to normally force the rolls 163 toward the platen S. Centrally of the sleeve 160 is mounted an arm 161, and to this arm is connected a spring-plate 168, (see Fig. 5,) the free end of which is brought upward around the hub of the arm 161 and downward toward the platen S to bear against the back side of the paper-table T, which table is thus forced into like bearing against the platen S. The paper-table T is provided with the usual rearwardly-extending ears 169, whereby it is pivotally mounted on the sleeve 160 of the platen-frame, and to the lower edge of the table T is attached a scale-plate $t$ for the guidance of the operator when the platen is turned upward to expose the line of print. The table T serves to direct the sheets of paper around the platen, and as the sheets pass beyond the lower edge of the table they are received by the rear ends of the guide-fingers 142. It will be understood, of course, that the table T is formed with the usual cut-away spaces to permit the bearing of the rolls 163 against the platen.

In order to enable the operator to relieve the pressure of the rolls 163 and the table T when the paper is to be shifted or for similar purposes, the two end arms 161 (see Figs. 1, 5, and 17) are each formed with an upward extension 170, which are in or nearly in contact with table T, and to one of these upward extensions is rigidly connected (or is formed in piece therewith) the inner offset end of a lever 171, that extends forward to be conveniently reached by the operator, and by depressing the forward end of the lever 171 the table T, the shaft 162, and the back presser-rolls carried thereby can be moved away from the platen. The lever 171 is provided with a stop-rod 172, adapted to contact with the adjacent end bar 122 of the supplemental carriage in order to limit the downward movement of the lever 171.

In order to effect the shifting of the platen at right angles to the line of travel of the main carriage for the purpose of bringing either of several type upon a single type-bar to the proper printing-point, the mechanism next to be described is employed. To the rear bar of the carriage B (see Figs. 5 and 6 to 11) is pivotally mounted, as at 180, the latch-plate 181, the lower edge of which is provided with a lug 182, adapted to enter a corresponding hole formed in the rear bar of the frame N, and when the frame N is in the position for the printing of "lower-case" letters it will be locked to the carriage B by the latch 181. The rear bar of the frame N is formed with lugs $n^4$, between which is pivotally hung a release-arm $n^5$, the shoulder $n^6$ of which serves to limit the downward movement of the arm, while the upturned end $n^7$ of the arm is adapted to contact with the lug 182 of the latch-plate 181 and disengage the latch-plate from the frame N. The under side of the release-arm $n^5$ is curved or inclined, as shown, and beneath this arm extends a releasing-rod 184, the ends of which are connected to rock-arms 185, mounted upon journals 186, (see Fig. 6,) extending from the lugs 6, that depend from the top plate of the main frame. (See Fig. 3.) The hub of one of the arms 185 is formed with an arm 187, to which is connected the upper end of a rod 188, that leads to the upper-case key-lever 189. Above the latch-plate 181 extends a bent arm or stop $b^8$, (see Figs. 1 and 8,) that serves to limit the upward movement of the latch 181. By reference more particularly to Figs. 5 to 11 of the drawings it will be seen that when it is desired to shift the supplemental platen-frame and the platen S from the lower-case to the upper-case printing position the operator will depress the finger-key 190 of the upper-case lever 189, thereby causing the rod 184 to engage the under side of the release-arm $n^5$ and shift this arm from the position seen in Fig. 9 to the position shown in Fig. 10 of the drawings. As the arm $n^5$ is thus shifted it will lift the latch 181 from engagement with the frame N during the initial downward movement of the key-lever 189, and as the key-lever is further depressed the shifting rod 184 will contact with the rollers $n^9$, that depend from the under side of the frame N, and will thus shift backward this frame and with it the platen that is supported therefrom. As soon as pressure on the finger-key 190 is relieved the key-lever 189 will assume its normal position, the shift-rod 184 being drawn normally forward by the coil-spring 191, that extends beneath the top plate of the main frame and connects one of the rocking arms 185 with the lug 38, that depends from the top plate. (See Figs. 3 and 6.)

As it is sometimes desirable to retain the platen in the upper-case position, the upper-case lock mechanism next to be described is provided. Upon the upper-case key-lever 189 is pivotally mounted, as at 200, an angular latch-plate 201, the lower front arm of which is formed with a slot, through which passes a pivot-pin 202, that projects from the front end of a supplemental key-lever 203, that is pivoted, as at 204, to the upper-case key-lever 189. The upper arm of the latch-plate 201 is formed with a notch 205, adapted to engage with an adjacent part 206 of the main frame when the latch-plate is shifted to the position shown by dotted lines in Fig. 6 of the drawings. Suitable stop-pins 207 and 208 limit the pivotal movement of the latch-plate 201. When the operator desires to print with the upper-case letters to any considerable extent, the finger-piece 209 of the supplemental key-lever 203 will be depressed and swung forward, thereby causing the rear arm of the key-lever 203 to swing upward, so that as soon as the notched upper end 205 of the latch 201 is below the part 206 of the main frame the notched end 205 will swing into engagement with the part 206, and thus retain the upper-case key-lever in depressed position. When, however, the operator desires to resume the printing of lower-case letters, a slight further depression of the key-lever 189 will cause the disengagement of the notched upper end 205 of the latch 201 from the part 206 of the main frame, since the latch and supplemental key-lever 203 normally gravitate to the position shown by full lines in Fig. 6 of the drawings.

The mechanism for turning the platen to effect the necessary spaces between lines will next be described, reference being had more particularly to Figs. 1, 4, 25, and 30 to 35 of the drawings.

The right-hand end bar 122 of the platen-frame has preferably formed in piece therewith a depending arm 222, to the lower end of which is pivoted the line-space lever U; the free end of which extends forwardly and downwardly over the front of the machine. It is by means of this lever U that the paper-carriage will be retracted from left to right to begin the lines of printing, and by this lever also the partial revolutions of the platen necessary to effect the spacing between the lines of print will be effected. To an arm $u$, projecting from the lever U, is pivoted a line-feed pawl 225, the front end of this pawl being bent inwardly and then downwardly to engage the teeth of the ratchet-wheel $w$ on the right-hand end of the platen S. The right-hand end of the platen S is surrounded by an annular hood V, in the side of which is formed the opening $v$, through which projects the angular portion of the feed-pawl 225. The hood V is preferably formed in piece with the right-hand end bar 122 of the platen-frame, or it may be formed separate from and connected thereto. The purpose of the hood V is not only to protect the inclosed parts, but, also, being of the same diameter as the platen, it permits a wider sheet of paper to be employed.

Upon the front bar 123 of the platen-frame and at the right-hand end thereof is mounted a torsion-spring 226, one end of which is fixed to the bar, while the other end engages the lever U and serves to hold the same normally in the position shown by full lines in Fig. 30 of the drawings. In order to prevent the overthrow of the platen or its revolution beyond a predetermined extent, a check-pawl or dog 227 is pivoted upon a pin 228 within the hood V. This dog or pawl is held normally in the position shown by a small plate-spring $227^a$ within the hood, and the upper end of the dog or pawl is adapted to be struck by the end of the feed-pawl 225 at the end of its forward movement, and when the pawl 225 strikes the upper end of the dog 227 the lower hooked end 229 of this dog will be forced into engagement with the teeth of the ratchet-wheel $w$ and will arrest the further revolution of the wheel, and consequently of the platen. In order to regulate the spaces between the lines of print, the inner end of the line-space lever U is formed with a series of notches or steps $u^2$, adapted to be engaged by the lower end of the line-space regulator X, that is pivoted, as at $x$, to the right-hand end bar 122 of the platen-frame. The upper end of the line-space regulator X is provided with a handle $x'$, whereby the regulator may be conveniently turned so that its lower end shall stand opposite either of the steps $u^2$ of the line-space lever U, and to the regulator X is fastened a plate-spring 231, that bears upon the end of a pin 232, (see Fig. 35,) that passes through the line-space regulator X and is adapted to enter either of several seats or notches 233 in the outer face of the hood V, (see Figs. 30 and 33,) these notches 233 being arranged in proper position to hold the line-space regulator so that its lower end shall engage either of the several notches $u^2$ of the line-space lever. The upper end of the line-space regulator X is formed with an offset or shoulder $x^2$, over which the pawl 225 will ride, the offset $x^2$ serving to engage the inclined shoulder $x^3$ upon the under side of the pawl, and thus insure the disengagement of the pawl from the ratchet-wheel $w$ on the release of the line-space lever U. It is obvious that by changing the line-space regulator from one to another of the notches $u^2$ the extent of downward movement of the lever U can be regulated, and consequently the backward movement of the line-feed pawl 225 can be so regulated as to enable this pawl to move backward over one, two, or three teeth of the ratchet-wheel $w$ and to correspondingly revolve the ratchet-wheel and platen when the line-space lever U is lifted.

At any suitable point within the hood V any desired form of spring-actuated detent may be employed in conjunction with the toothed wheel $w$ to prevent the platen from turning accidentally during the time of writing, but permitting the platen to be turned at will in either direction by the application of force to either of the hand-wheels $s$. Such a detent is indicated at 234.

It is observed that the feature of detaching the bars 4 from the top plate of the main frame permits of the quick removal of the rails 2 and 3 and the paper-carriage as an entirety, so as to enable work or repairs to be done upon or below the top plate. It is also observed that the removable feature of the platen-frame, the posts R, their base-pieces, and the links connecting the posts and base-pieces with the platen-frame permits of the substitution of similar parts, as when substituting a hard for a soft platen, or vice versa, to suit different characters of work in one and the same machine.

What I claim as new, and desire to secure by Letters Patent, is—

1. In a type-writing machine, the combination with the top plate of the main frame and a carriage, of parallel carriage track-rails connected together, and a latch for releasably securing the rails upon the top plate.

2. In a type-writing machine, the combination with the top plate of the main frame and a carriage, of an auxiliary carriage-supporting frame, comprising track-rails united by cross-bars, and a latch for releasably securing said carriage-supporting frame upon said top plate.

3. In a type-writing machine, the combination with the top plate of the main frame and a carriage, of slots in said top plate, front and rear carriage-supporting rails, cross-bars uniting said rails and seated within said slots, and latches coöperating with said slots to releasably secure the carriage-supporting rails upon said top plate.

4. In a type-writing machine, the combination with the top plate of the main frame having long slots therein, of the front and rear carriage-supporting rails, cross-bars uniting said rails and setting within the slots of the top plate and provided each with a side slot or groove, and thumb-nuts having arms to engage said slots or grooves for detachably locking said cross-bars to the top plate.

5. In a type-writing machine, the combination with a main frame and a paper-carriage, of front and rear carriage-supporting rails, cross-bars uniting said rails, and means for adjusting one of said rails independently of the other on said cross-bars, said adjusting means being independent of the main frame.

6. In a type-writing machine, the combination with a main frame and a paper-carriage, of front and rear carriage-supporting rails, one of said rails being interlocked with said cross-bars, and screws at the ends of said cross-bars and independent of the main frame for adjusting said interlocked rail relatively to the other rail, each of said screws extending longitudinally of its cross-bar and having a bearing thereon and also having a bearing upon the movable rail, for drawing the latter toward the other rail.

7. In a type-writing machine, the combination with the top plate of the main frame, of parallel carriage track-rails connected together and detachably connected with said top plate and having roller-bearings and one of said rails being adjustable toward and from the other rail, a carriage having roller-bearings, and rollers interposed between said rail and carriage-bearings, said connected carriage track-rails and carriage being removable as a whole.

8. In a type-writing machine, the combination with the paper-carriage provided with a rack-bar, of a carriage-driving gear-wheel engaging said rack-bar, a carriage-advancing spring connected with said gear-wheel, an escapement mechanism, a suitable clutch between said escapement mechanism and the gear-wheel and means for shifting said clutch.

9. In a type-writing machine, the combination with the paper-carriage provided with a rack-bar, of a carriage-driving gear-wheel engaging said rack-bar and provided with clutch-teeth, a carriage-advancing spring connected with said gear-wheel, a movable clutch provided with teeth or notches to engage the clutch-teeth of the gear-wheel and means for shifting said clutch to separate the clutch-teeth in order to permit the carriage to be moved independent of the escapement mechanism.

10. In a type-writing machine, the combination with a paper-carriage provided with a rack-bar, of a carriage-driving gear-wheel engaging said rack-bar and provided with clutch-teeth, a carriage-advancing spring, a movable clutch provided with teeth or notches to engage the clutch-teeth of the gear-wheel, means for shifting said clutch to separate the clutch-teeth in order to permit the carriage to be moved independent of the escapement mechanism, and a finger-piece suitably connected with said means for shifting said clutch.

11. In a type-writing machine, the combination with a paper-carriage provided with a rack-bar, of a carriage-driving gear-wheel engaging said rack-bar, a shaft whereon said gear-wheel is mounted, a carriage-advancing spring connected to said gear-wheel, a clutch-wheel and two series of clutch-teeth one united with the gear-wheel and the other with the clutch-wheel, a shifter engaging said clutch-wheel and means for operating said shifter from the paper-carriage.

12. In a type-writing machine, the combination with a paper-carriage provided with a rack-bar, of a carriage-driving gear-wheel having teeth upon its periphery to engage said rack-bar and having axially-arranged clutch-teeth, a clutch-wheel mounted concentrically with said gear-wheel and having axially-arranged clutch-teeth, a spring for forcing the clutch-wheel toward the gear-wheel, a shifter engaging the clutch-wheel to throw it out of action and suitable means connected with said shifter whereby it may be manually operated.

13. In a type-writing machine, the combination with a paper-carriage provided with a rack-bar, of a carriage-driving gear-wheel engaging said rack-bar, a shaft extending through said gear-wheel, a carriage-advancing convolute spring encircling said shaft and connected to said gear-wheel, a sliding clutch-wheel mounted concentrically with the gear-wheel, and provided with a peripheral groove, clutch-teeth arranged intermediate said clutch and said gear-wheel and whereby the two may be connected for unison movement, a ratchet-wheel mounted concentrically with the clutch-wheel, suitable escape-dogs for the escape of said ratchet-wheel, a shifter engaging the peripheral groove of the clutch-wheel and means for operating said shifter to disengage the clutch-wheel from the gear-wheel.

14. In a type-writing machine, the combination with a paper-carriage provided with a rack-bar, of a cup-shaped gear-wheel engaging said rack-bar, a convolute carriage-advancing spring within said gear-wheel and connected thereto, a shiftable clutch-wheel adapted to engage said gear-wheel, a ratchet-wheel connected with said clutch-wheel, suitable escape-dogs for engaging said ratchet-wheel and shifting mechanism whereby said clutch-wheel is disengaged from said gear-wheel.

15. In a type-writing machine, the combination with a paper-carriage provided with a rack-bar, of a carriage-driving gear-wheel engaging said rack-bar, an escapement mechanism, a clutch-wheel connected with said escapement mechanism and provided with means for engaging the gear-wheel, a shifter for operating said clutch-wheel to disengage it from the gear-wheel, a release-key upon the paper-carriage and suitable means intermediate said release-key and said shifter whereby the shifter may be operated by the release-key on the paper-carriage.

16. In a type-writing machine, the combination with the paper-carriage provided with a rack-bar, of a gear-wheel engaging said rackbar, a clutch-wheel mounted concentrically with said gear-wheel and free to slide toward and from the same, an escapement mechanism connected with said clutch-wheel, two series of bevel clutch teeth between said clutch-wheel and said gear-wheel, a shifter engaging the periphery of said clutch-wheel, a shifting-rod mounted upon the main frame and connected with said shifter and a release-key mounted upon the main carriage and having connected therewith a part extending in position to operate said shift-rod.

17. In a type-writing machine, the combination with a paper-carriage provided with a rack-bar, of a gear-wheel engaging said rack-bar, a clutch-wheel mounted concentrically with said gear-wheel and movable toward and from the same, a ratchet-wheel also mounted concentrically with said clutch-wheel, suitable escapement-dogs for engaging said ratchet-wheel, interlocking clutch-teeth arranged between said gear-wheel and said clutch-wheel, a pivoted shifter engaging the periphery of said clutch-wheel, rods extending beneath the top plate of the main frame and connected to said shifter, a shift-rod arranged above the top plate of the main frame and connected to said rods beneath the top plate, a release-key mounted upon the paper-carriage and suitable connections whereby said release-key will operate said shift-rod irrespective of the position of the carriage.

18. In a type-writing machine, the combination of escapement-controlled carriage-driving mechanism having a clutch, a carriage, a transverse rod or bail movably connected to the main frame and extending parallel with the line of travel of the carriage, a shifting rod or bail pivotally connected with the carriage and adapted to actuate said transverse rod or bail in all positions of the carriage, and connections between the transverse rod or main-frame bail and the clutch for disengaging the latter.

19. In a type-writing machine, the combination of escapement-controlled carriage-driving mechanism having a clutch, a carriage, a transverse rod movably connected to the main frame and extending parallel with the line of travel of the carriage, a shifting rod or bail pivotally connected to the carriage and adapted to actuate the main-frame bail-rod in all positions of the carriage, a key for actuating said shifting-rod, and connections intermediate the transverse rod and the clutch for disengaging the clutch.

20. In a type-writing machine, the combination of an escapement-controlled carriage-driving mechanism having a clutch provided with a peripheral groove, a carriage, a frame pivotally hung to the main frame and provided with arms engaging said peripheral groove at opposite sides thereof, rods engaging said frame at opposite sides of the clutch and extending forwardly of the machine, a transverse rod connecting the forwardly-extending rods and extending parallel with the line of travel of the carriage, and means on the carriage adapted to coact with the transverse rod in all positions of the carriage to shift the pivoted frame to open the clutch.

21. In a type-writing machine, the combination of a spring-drum, a carriage connected with the drum, an escapement-wheel, a clutch intermediate said escapement-wheel and drum and provided with a peripheral groove, a frame H bowed around the clutch and pivoted to the main frame and provided with arms engaging said peripheral groove at opposite sides, rods 37 connected with the frame H at opposite sides of the clutch and extending forwardly, a rod 39 connecting said rods 37 and extending parallel with the path of travel of the carriage, and means on the carriage adapted to actuate the rod 39 in all positions of the carriage to disengage the clutch, with a spring for closing said clutch.

22. In a type-writing machine, the combination of escapement-controlled carriage-driving mechanism having a clutch, a carriage, a rod 40 pivotally connected by arms or levers of the carriage and extending across the carriage parallel with the line of travel thereof, a rod 39 parallel with the rod 40 and movably mounted on the main frame and adapted to be actuated by rod 40 in all positions of the carriage, and connections intermediate said rod 39 and the clutch for operating the latter.

23. In a type-writing machine, the combination of escapement-controlled carriage-driving mechanism having a spring-pressed clutch, a carriage, a rod 40 extending across the carriage parallel with the path of travel thereof and pivotally connected by arms to the carriage, a rod 39 above the top plate of the main frame and adapted to be operated by the rod 40 in all positions of the carriage, movable rods 37 at each side of the center of the machine and guided below the top plate and carrying the rod 39, and connections intermediate said rods 37 and the clutch for operating the latter.

24. In a type-writing machine, the combination with a paper-carriage provided with a rack-bar, of a gear-wheel engaging said rackbar, a shaft whereon said gear-wheel is mounted, a convolute carriage-advancing spring connected to said shaft and to said gear-wheel, a clutch-wheel and a ratchet-wheel through both of which said shaft extends, a handle connected to said shaft whereby the tension of said spring may be varied, a spring for forcing the clutch-wheel into normal engagement with the gear-wheel and a shifter whereby the clutch-wheel may be disengaged from the gear-wheel.

25. In a type-writing machine, the combination with an escapement ratchet-wheel, of fixed and limber escape-dogs, a vibratory frame upon the top of which said dogs are mounted, the limber dog being pivotally supported and being provided with projecting arms and set-screws whereby the extent of its pivotal movement is determined.

26. In a type-writing machine, the combination of a vibratory frame, a holding-dog, means for securing the dog rigidly to the frame, horizontally-extending wings on the dog and adapted to rest on the top of the frame, a lug on said wing portion, a spring-pressed feed-dog pivoted between said lug and holding-dog and provided with horizontally-extending arms, and adjusting-screws engaging threaded holes in said arms and adapted to coact with the top of the wing portion to limit the motion of the feed-dog.

27. In a type-writing machine, the combination with the paper-carriage, of a margin stop-bar at the rear of said carriage, a right-hand margin-stop mounted upon said margin stop-bar and provided at its inner end with a pawl, a sliding stop-arm arranged in the path of said pawl, and a shifting-rod connected with said sliding stop-arm and extending to the front of the machine.

28. In a type-writing machine, the combination of a carriage, a bell, a bell-striker, a carriage-stop on the framework, a pivoted trip-arm on the carriage adapted to operate the bell-striker and to coact with the carriage-stop to arrest the carriage, and means for moving said carriage-stop out of the path of said trip to permit the further advance of the carriage.

29. In a type-writing machine, the combination with the main paper-carriage, of a supplemental platen-carriage comprising a frame located beneath the main carriage and sliding bars connected to said frame located above the main carriage, and a platen supported by said sliding bars, said sliding bars and frame being connected together and mounted to move at right angles to the line of travel of the main carriage and said frame located beneath the main carriage comprising a pair of rigidly-united end bars.

30. In a type-writing machine, the combination with the main paper-carriage, of a supplemental platen-frame comprising a U-shaped frame made in one piece and mounted beneath the main carriage, sliding bars mounted above said main carriage and connected to said U-shaped frame at its ends, and anti-friction-balls interposed between said sliding end bars and said paper-carriage.

31. In a type-writing machine, the combination with the main paper-carriage having its end bars slotted, of a supplemental platen-carriage comprising a frame located beneath the main carriage, sliding end bars located above the end bars of the main carriage and attached through said slots to the frame beneath the carriage, and a plate or bar extending above the carriage and connecting the front ends of said sliding bars.

32. In a type-writing machine, the combination with the main carriage and with the supplemental platen-carriage mounted thereon and having a scale-plate at its front, of an indicator-pointer connected to the main frame in front of said main carriage and extending over the scale-plate of the supplemental carriage, said indicator-pointer being provided with an inwardly-extending fixed supplemental pointer $P^2$, which is in proximity to the printing-point upon the platen when the supplemental platen-carriage is turned upward to expose the line of printing.

33. In a type-writing machine, the combination with a platen, of a platen-frame and a carriage, said platen-frame being mounted upon posts or brackets, and said posts or brackets having seats upon said carriage and being releasably held upon said seats by means of latches.

34. In a type-writing machine, the combination with a platen, of a platen-frame and a carriage, said platen-frame being pivotally connected with posts or brackets, which have seats upon said carriage and are releasably held upon said seats by means of latches.

35. In a type-writing machine, the combination with a platen, of a platen-frame and a carriage, said platen-frame being pivotally connected with posts or brackets which have seats upon the end bars of the carriage and are releasably held upon said seats by means of latches.

36. In a type-writing machine, the combination with the main paper-carriage and with the supplemental platen-carriage mounted thereon, of a platen, a supporting-frame for said platen, and suitable posts in pivotal connection with said platen-supporting frame, said posts being detachably connected to the end bars of the supplemental platen-carriage.

37. In a type-writing machine, the combination with the main carriage and with the supplemental carriage mounted thereon, of lugs projecting from the end bars of the supplemental carriage, platen-supporting posts resting upon said end bars and engaging said lugs, and spring-actuated locking bars or lugs for detachably fastening said platen-supporting posts to the end bars of the supplemental carriage.

38. In a type-writing machine, the combination with the main paper-carriage and with the supplemental platen-carriage mounted thereon, of dovetailed lugs or studs rising from the end bars of said supplemental carriage, the platen-supporting posts and bases provided with dovetailed portions to engage said lugs or studs, a platen and a supporting-frame for said platen pivotally connected with said platen-supporting posts.

39. In a type-writing machine, the combination with the carriage mechanism, of platen-supporting posts or brackets detachably connected with the carriage mechanism, and spring-actuated locking-plungers for holding said platen-supporting posts or brackets in position.

40. In a type-writing machine, the combination with the carriage mechanism and with the platen and its supporting-frame, of supporting posts or brackets, arms at the ends of said supporting-frame and in rigid connection therewith, pivot-links connecting said arms with the tops of the supporting posts or brackets, and links whereby said supporting-frame is pivotally connected at points in front of said posts or brackets.

41. In a type-writing machine, the combination with the carriage mechanism and with the platen and a supporting-frame for said platen, of supporting posts or brackets located at the ends of said platen-frame and having forwardly-extending base portions, arms in rigid connection with said platen-supporting frame, links pivotally connecting said arms to the tops of the supporting posts or brackets, and pivot-links connecting the supporting-frame with the bases of said supporting posts or brackets.

42. In a type-writing machine and in a platen-tilting mechanism, the combination of a carriage provided with open seats or bearings for the platen-shaft, a platen, a platen-shaft, a frame in which said shaft is journaled, links pivotally connected with said shaft and with the carriage in front of said seats or bearings, arms on the platen-supporting frame and extending or standing normally over the platen-shaft, and links pivotally connected with said arms and with said carriage in rear of said arms and above the said seats.

43. In a type-writing machine and in a platen-tilting mechanism, the combination of a platen-frame, a platen journaled in said frame, arms connected to the ends of the platen-frame, links 120 pivotally connected at one end to a relatively stationary part of the carriage and at the other end to the platen-frame arms, and links 125 each pivotally connected at one end to a relatively fixed part on the carriage and at the other end to the platen shaft or axle, said links 120 and 125 being at opposite sides of the shaft or axle, and adapted to control the platen in its turning up and turning down movements.

44. In a type-writing machine and in a platen-tilting mechanism, the combination of a platen-frame, a platen, a platen-axle, a base-piece at each end of the platen having an open bearing for the platen-axle, a post or bracket extending upwardly from each base-piece, a link for connecting each post or bracket with the platen-frame, and a second link for each base-piece and pivotally connected to its base-piece and to the platen shaft or axle.

45. In a type-writing machine, the combination of a carriage, a platen-frame, a platen, a platen-axle, a base-piece at each end of the platen having an open bearing for the platen-axle and detachably connected with the carriage, a post or bracket extending upwardly from each base-piece, a link for and connecting each post or bracket with the platen-frame, and a second link for each of said base-pieces and pivotally connected thereto and to the platen axle or shaft.

46. In a type-writing machine, the combination of a carriage having seats in its end bars, a platen-frame, a platen, a platen-axle, base-pieces each having an open bearing for the platen-axle and adapted to the seats in the carriage, means for holding said base-pieces detachably in said seats, a post or bracket extending upwardly from each base-piece, a link for and connecting each of said posts or brackets with the platen-frame, and a link for and connecting each base-piece and the platen shaft or axle.

47. In a type-writing machine, the combination of a platen-frame, a platen journaled in said frame, arms connected to the ends of the platen-frame, links 120 pivotally connected at one end to a relatively stationary part of the carriage, and one of said links being provided with a hole or indentation, a spring-pressed beveled pin on the corresponding stationary part of the carriage and adapted to engage said hole to offer a resistance to the turning down of the platen, and links 125 pivotally connected to a relatively fixed part of the carriage and to the platen shaft or axle, said links 120 and 125 being on opposite sides of the said shaft or axle.

48. In a type-writing machine, the combination with the detachable main paper-carriage and with the supplemental paper-carriage mounted to move transversely thereof, of a shifting-bar extending longitudinally beneath the main paper-carriage, a part extending from said supplemental carriage in position to be engaged by said shifting-bar, a latch for locking said main and supplemental carriages together, means for releasing said latch located in the path of the shifting-bar and adapted to be operated by said bar during its initial movement, and key-lever mechanism whereby said shifting-bar is manually operated, the construction and arrangement being such that the main paper-carriage, together with the supplemental paper-carriage, may be detached from the machine and from said shifting-bar, and such that when said carriages are in place upon the machine, said shifting-bar operates to automatically release the latch and shift said supplemental carriage.

49. In a type-writing machine, the combination with the main carriage and with the supplemental carriage mounted thereon, of a latch connecting said main and supplemental carriages, a pivoted release-arm for said latch, a shifting-bar extending longitudinally beneath the carriage at its rear and adapted to contact with a part depending from the supplemental carriage, said release-arm being located intermediate the shifting-bar and the depending part of the supplemental carriage, whereby the initial movement of said shifting-bar shall disconnect the carriages to permit the supplemental carriage to be shifted.

50. In a type-writing machine, the combination of a main carriage, a latch-piece pivoted thereto, a shifting platen-frame provided with a perforation to receive said latch-piece to lock the frame and carriage together, a release-arm adapted to operate and release the latch and pivoted on the platen-frame, a shift-bar and a projecting part on the platen-frame for coaction with the shift-bar and relatively farther from the shift-bar than said release-arm whereby the platen-frame is first unlocked and then shifted by a single movement of the shift-bar.

51. In a type-writing machine, the combination of a main carriage, a shifting platen-frame thereon provided with a perforation, a gravity-latch device on the main carriage adapted to coact with said perforated part on the platen-frame, a curved arm pivoted to the platen-frame and provided with an upright portion adapted to actuate said latch device, a depending part on the platen-frame adapted to coact with the shift-bar, said shift-bar, depending part and curved release-arm being relatively arranged so that the shift-bar first operates the release-arm and then shifts the platen-frame by a single movement of the shift-bar.

52. In a type-writing machine, the combination of a main carriage, a platen-frame having a part extending under a bar of said main carriage, a perforation in said under part, latch-plate 181 having a tongue 182 adapted to engage said perforation to lock the frame and carriage together, a curved release-arm $n^5$ provided with a stop-shoulder $n^6$ adapted to coact with a part of the platen-frame to limit the downward motion of the curved arm, rollers $n^9$ on the platen-frame, and a shift-bar, said shift-bar, arm $n^5$ and rollers $n^9$ being relatively arranged so that the shift-bar operates the release-arm to release the platen-frame and then coacts with the rollers $n^9$ to shift the platen-frame by a single movement.

53. In a type-writing machine, the combination of a main carriage, a shifting platen-frame provided with a perforation, a pivoted latch-piece on the main carriage adapted to descend to engage said perforation, independently-pivoted means for lifting said latch-piece to disengage the shifting platen-frame, and a stop to limit the upward motion of the latch-piece.

54. In a type-writing machine, the combination with the carriage mechanism, of a platen-supporting frame pivotally mounted thereon to permit the platen to be upturned to expose the line of print, a projection extending forwardly from said platen-supporting frame, a pivoted latch for engaging said projection to hold the platen-supporting frame in working position, a shoulder or offset connected with said latch, and a pivoted lever whereby said platen-supporting frame is tilted, said pivoted lever having a projection adapted to engage said shoulder or offset and release the latch during the initial movement of the lever.

55. In a type-writing machine, the combination with the platen and with the front bar of its supporting-frame, of a presser-roll, a sliding block mounted upon said front bar and carrying said presser-roll, and a spring-finger extending diagonally downwardly and inwardly from the upper part of said presser-block and beneath the platen.

56. In a type-writing machine, the combination with the platen and its supporting-frame, of a sleeve mounted upon the back rod of the platen supporting frame, journal-arms connected to said sleeve, a shaft connected to said journal-arms and having one or more presser-rolls mounted thereon, a spring for forcing said presser-rolls toward the platen and a releasing-arm connected with said sleeve and serving to move the back presser roll or rolls away from the platen.

57. In a type-writing machine, the combination with the platen and its supporting-frame, of a sleeve mounted upon the back rod of said supporting-frame, journal-arms connected to said sleeve, a shaft carried by said journal-arms and provided with one or more presser-rolls, a paper-table connected to said sleeve, springs for forcing said presser roll or rolls and said table toward the platen, and a releasing-arm connected with said sleeve whereby said presser-roll and said table may be simultaneously moved away from said platen.

58. In a type-writing machine, the combination of a platen, a back rod on the platen-carrier, a sleeve rotatably mounted on said rod, downwardly-extending arms rigid with said sleeve, pressure-rolls supported by said arms, a spring-pressed paper-table having the same axis of motion as said sleeve, upwardly-extending arms rigid with said sleeve and adapted to coact with the back of the upper portion of said table, and a lever rigidly connected for operating said sleeve and arms, whereby the pressure-rolls and table may be simultaneously moved away from the platen by a single movement of said lever.

59. In a type-writing machine, the combination with the main paper-carriage, the supplemental carriage and the platen supported thereby, of upper-case key-lever mechanism for said supplemental carriage comprising a shift-rod adapted to force backward said supplemental carriage, an upper-case key-lever connected with said shift-rod, a supplemental key pivotally mounted upon said key-lever at its front, and a pivoted latch-bar connected to said supplemental key-lever and having a part adapted to engage a fixed part of the main frame in order to retain the upper-case key-lever in depressed position.

60. In a type-writing machine, the combination of a shifting platen-carrier, a platen-shifting key-lever, connections between said lever and platen-carrier, a supplemental key pivoted to said key-lever, an angular latch-plate pivoted to said key-lever and connected with the supplemental key, and a fixed part of the main frame with which said latch-plate is adapted to engage when the supplemental key is used to depress the key-lever and shift the platen, thereby locking the platen in shifted position.

61. In a type-writing machine, the combination of a shifting platen-carrier, a key-lever connected with the platen-carrier for shifting the same, a supplemental key pivoted to said key-lever, an angular plate 201 pivoted at one end to the said key-lever and operatively connected at the other end with said supplemental key and provided with an upright notched end, and a lug or bar 206 on the main frame adapted to coact with said notched end to retain the shifting key-lever in depressed position.

62. In a type-writing machine, the combination with the platen and its supporting-frame and with the ratchet-wheel at the end of said platen, of a hood inclosing said ratchet-wheel, a line-space lever pivotally connected to said supporting-frame, a feed-pawl pivoted to said line-space lever and adapted to engage said ratchet-wheel, and a locking-pawl located within said hood and having an arm extending into position to be engaged by said feed-pawl in order to cause said locking-pawl to arrest the ratchet-wheel.

63. In a type-writing machine, the combination with the platen and its supporting-frame and with the ratchet-wheel at the end of said platen, of a line-space lever pivotally connected to said supporting-frame and provided at one end with a series of steps or notches, a feed-pawl pivotally connected with said line-space lever and extending into position to engage the ratchet-wheel, and a line-space regulator having an arm arranged to engage either of the steps or notches of the line-space lever to limit its return movements, and means for holding said line-space regulator in either of several positions.

64. In a type-writing machine, the combination of a platen, a line-space ratchet-wheel thereon, a line-space lever, a pawl pivotally connected with said lever and extending into position to engage the ratchet-wheel, a pivoted line-space regulator provided with an arm adapted to engage said line-space lever to control the throw thereof and provided with an offset adapted to coact with a part on said pawl to lift the same from engagement with said ratchet-wheel on the return motion of the line-space lever.

65. In a type-writing machine, the combination of a platen having the printing-point at the under side thereof, a ratchet-wheel on and of less diameter than the platen, a platen-frame in which the platen is journaled, a hood on the frame and of the same diameter as the platen and inclosing said ratchet-wheel and provided with an opening at the upper side thereof, a line-space lever pivoted to the platen-frame below the platen-axle, a line-feed pawl pivotally connected with said lever, and offset to extend through the opening in the hood, and a line-space regulator-lever pivoted to the platen-frame and having an arm adapted to engage the end of the line-space lever to vary the throw thereof and also having an offset portion to engage the said line-feed pawl to lift the same from the ratchet-wheel on the return of the line-feed lever.

66. In a type-writing machine, the combination of a platen-frame, a platen journaled therein and provided at one end with a ratchet-wheel of less diameter than the platen, a hood of the same diameter as and concentric with the platen and connected with the platen-frame and surrounding said ratchet-wheel and provided with an opening therein, a line-space lever pivoted to said frame, an offset line-feed pawl extending through said opening to engage the ratchet, and a locking-dog pivoted within said hood and normally disengaged from the ratchet-wheel and adapted to be thrown into locking engagement therewith by the line-feed pawl as the latter completes its movement.

67. In a type-writing machine, the combination of a platen-frame, a platen journaled in said frame, a bent lever pivoted between its ends to said frame and having one end extending rearwardly, a line-feed pawl pivotally connected with said lever toward the other end thereof and extending rearwardly, a ratchet-wheel on said platen, and a line-space regulator-lever pivoted between its ends to the platen-frame and having an offset or arm adapted to engage the said pawl to lift the same from the ratchet-wheel in all positions of the regulator and adapted to coact with the rearwardly-extending arm of the line-feed lever to regulate or vary the throw thereof.

68. In a type-writing machine, the combination with the top plate of the main frame, and a carriage, of parallel carriage track-rails connected together and forming a frame, seats upon said top plate for said rail-frame, and a latch or latches for releasably securing said rail-frame upon said top plate.

69. In a type-writing machine, the combination with the top plate of the main frame, and a carriage, of slots in said top plate, lugs 5 and 6, front and rear carriage-supporting rails, cross-bars uniting said rails and seated within said slots and resting upon said lugs, and latches coöperating with said slots and lugs to releasably secure the carriage-supporting rails upon said top plate.

Signed at borough of Manhattan, city of New York, in the county of New York and State of New York, this 10th day of January, A. D. 1899.

ZALMON G. SHOLES.

Witnesses:
JACOB FELBEL,
K. V. DONOVAN.